(12) United States Patent
Hattingh et al.

(10) Patent No.: US 10,063,822 B2
(45) Date of Patent: Aug. 28, 2018

(54) TRI-SURFACE IMAGE PROJECTION SYSTEM AND METHOD

(71) Applicant: Pointcloud Media, LLC, Sugar Land, TX (US)

(72) Inventors: Jacobus G. Hattingh, Sugar Land, TX (US); Alan Demafiles, Richmond, TX (US)

(73) Assignee: POINTCLOUD MEDIA, LLC, Sugar Land, TX (US)

( * ) Notice: Subject to any disclaimer, the term of this patent is extended or adjusted under 35 U.S.C. 154(b) by 0 days.

(21) Appl. No.: 15/692,329

(22) Filed: Aug. 31, 2017

(65) Prior Publication Data

US 2018/0027219 A1 Jan. 25, 2018

Related U.S. Application Data

(63) Continuation of application No. 14/843,088, filed on Sep. 2, 2015, now Pat. No. 9,787,958.
(Continued)

(51) Int. Cl.
*G09G 5/00* (2006.01)
*H04N 9/31* (2006.01)
(Continued)

(52) U.S. Cl.
CPC ........... *H04N 9/3185* (2013.01); *G06F 3/011* (2013.01); *G06T 3/005* (2013.01); *H04N 5/23238* (2013.01); *H04N 5/2628* (2013.01); *H04N 9/3147* (2013.01); *H04N 9/3194* (2013.01); *H05K 999/99* (2013.01); *G02B 13/06* (2013.01)

(58) Field of Classification Search
None
See application file for complete search history.

(56) References Cited

U.S. PATENT DOCUMENTS 6,011,562 A 1/2000 Gagne et al.
6,538,654 B1 3/2003 Rose et al.
(Continued)

OTHER PUBLICATIONS

"Cinerama", Popular Science, Aug. 1950.
(Continued)

*Primary Examiner* — Peter Hoang
(74) *Attorney, Agent, or Firm* — Jeffrey L. Wendt; The Wendt Firm, P.C.

(57) ABSTRACT

Digitally acquiring digital media content using a computer model simulation of a real venue in which the digital content is to be shown. Frontally projecting content from a virtual center of the simulated venue, the real venue having a frontal screen and two side screens. Digitally capturing the frontally projected digital media content from a view that a real frontal projector and two real side projectors would have in real life in order to "bake in" a warped transformation of the frontally projected digital media content. Projecting the warped, transformed frontally projected content through a frontal digital projector and two side digital projectors in the real venue, thus completing an illusion of a "cinematic window" of the digital media content in the real venue. Controlling the digital projectors using a digital server to feed the three digitally captured, warped media streams synchronously to the front, left and right digital projectors.

17 Claims, 15 Drawing Sheets

Related U.S. Application Data

(60) Provisional application No. 62/051,711, filed on Sep. 17, 2014.

(51) Int. Cl.
| | | |
|---|---|---|
| *G06T 3/00* | (2006.01) | |
| *G06F 3/01* | (2006.01) | |
| *H04N 5/232* | (2006.01) | |
| *H04N 5/262* | (2006.01) | |
| *G02B 13/06* | (2006.01) | |

(56) References Cited

U.S. PATENT DOCUMENTS

| | | |
|---|---|---|
| 6,563,504 B1 | 5/2003 | Rose et al. |
| 6,686,918 B1 | 2/2004 | Cajolet et al. |
| 7,007,295 B1 | 2/2006 | Rose et al. |
| 7,336,264 B2 | 2/2008 | Cajolet et al. |
| 7,364,310 B2 | 4/2008 | Yamazaki |
| 7,656,402 B2 | 2/2010 | Abraham et al. |
| 7,791,608 B2 | 9/2010 | Henson et al. |
| 7,940,268 B2 | 5/2011 | Zhou et al. |
| 7,940,269 B2 | 5/2011 | Zhou et al. |
| 7,967,445 B2 | 6/2011 | Hamano et al. |
| 8,054,311 B1 | 8/2011 | Sheffler et al. |
| 8,167,695 B2 | 5/2012 | Rowe |
| 8,176,124 B2 | 5/2012 | Graham |
| 8,184,906 B2 | 5/2012 | Chaffey |
| 8,257,157 B2 | 9/2012 | Polchin |
| 8,269,778 B1 | 9/2012 | Baraff et al. |
| 8,305,378 B2 | 11/2012 | Borac |
| 8,317,606 B2 | 11/2012 | Graham et al. |
| 8,325,178 B1 | 12/2012 | Ressing et al. |
| 8,339,402 B2 | 12/2012 | Henson et al. |
| 8,352,060 B2 | 1/2013 | Chun et al. |
| 8,358,310 B2 | 1/2013 | Miller et al. |
| 8,364,561 B2 | 1/2013 | Wolper et al. |
| 8,379,028 B1 | 2/2013 | Mullins |
| 8,387,099 B2 | 2/2013 | Perlman |
| 8,400,455 B2 | 3/2013 | Gregory et al. |
| 8,401,284 B2 | 3/2013 | Pettigrew et al. |
| 8,428,326 B2 | 4/2013 | Falk et al. |
| 8,442,764 B2 | 5/2013 | Schulze et al. |
| 8,468,575 B2 | 6/2013 | Perlman et al. |
| 8,471,844 B2 | 6/2013 | Davidson et al. |
| 8,485,893 B2 | 7/2013 | Rowe |
| 8,522,201 B2 | 8/2013 | Elmieh et al. |
| 8,564,644 B2 | 10/2013 | Engle et al. |
| 8,576,225 B2 | 11/2013 | Garg et al. |
| 8,576,228 B2 | 11/2013 | Davidson et al. |
| 8,599,197 B1 | 12/2013 | Yu et al. |
| 8,606,942 B2 | 12/2013 | Perlman et al. |
| 8,633,933 B2 | 1/2014 | Henson et al. |
| 8,654,121 B1 | 2/2014 | Yu et al. |
| 8,665,258 B2 | 3/2014 | Diverdi et al. |
| 8,665,261 B1 | 3/2014 | Baraff et al. |
| 8,669,980 B1 | 3/2014 | Quaroni et al. |
| 8,674,988 B2 | 3/2014 | Tamstorf et al. |
| 8,681,147 B1 | 3/2014 | Baraff et al. |
| 8,698,810 B2 | 4/2014 | Witkin et al. |
| 8,704,823 B1 | 4/2014 | Waggoner et al. |
| 8,711,141 B2 | 4/2014 | Xie et al. |
| 8,711,923 B2 | 4/2014 | Perlman et al. |
| 8,743,126 B2 | 6/2014 | Lanciault et al. |
| 8,786,611 B1 | 7/2014 | Comet et al. |
| 8,810,590 B2 | 8/2014 | Oat et al. |
| 8,817,013 B2 | 8/2014 | Meischner |
| 8,823,711 B2 | 9/2014 | Mital et al. |
| 8,832,772 B2 | 9/2014 | Perlman et al. |
| 8,847,963 B1 | 9/2014 | Comet et al. |
| 8,860,734 B2 | 10/2014 | Sieka |
| 8,881,215 B2 | 11/2014 | Perlman |
| 8,893,207 B2 | 11/2014 | Perlman et al. |
| 2004/0100482 A1 | 5/2004 | Cajolet et al. |
| 2006/0092154 A1 | 5/2006 | Lee |
| 2012/0038628 A1 | 2/2012 | Corazza et al. |
| 2013/0050185 A1 | 2/2013 | Xie et al. |
| 2013/0181901 A1 | 7/2013 | West |
| 2013/0257851 A1 | 10/2013 | Lee et al. |
| 2014/0016041 A1 | 1/2014 | Kim et al. |
| 2014/0340330 A1* | 11/2014 | Trachtenberg ........ G06F 1/1626 345/173 |
| 2016/0080710 A1 | 3/2016 | Hattingh et al. |
| 2016/0148432 A1 | 5/2016 | Hattingh |

OTHER PUBLICATIONS

"Cinerama", Wikipedia, Sep. 3, 2014.
"A Deal with the Devil", Computer Graphics World, Apr. 7, 2014.
"CinemaCon 2014: Barco pulls back curtain on surround cinema experience", L.A. Biz, downloaded from the Internet Sep. 2, 2014 at url http://www.bizjournals.com/news/2014/04/01/cinemacon-2014-barco-pulls-back-curtain-on.html?page=all, on Sep. 2, 2014.
"270-degree ScreenX technology shows ultra-wide movies on three walls", The Verge, Oct. 18, 2013.
"CinemaCon: Barco Unveils 'Wraparound' Screen System", Variety, Mar. 24, 2014, access via the Internet at url http://variety.com/2014/films/news/cinemacon-barco-unviels-wraparound-screen-system-1201145427/, on Sep. 2, 2014.

* cited by examiner

TRI-SURFACE IMAGE PROJECTION SYSTEM AND METHOD

CROSS-REFERENCE TO RELATED APPLICATIONS

This application claims benefit of and priority to U.S. non-provisional patent application Ser. No. 14/843,088, filed Sep. 2, 2015, now U.S. Pat. No. 9,787,958, issued Oct. 10, 2017, which claims benefit of and priority to U.S. provisional application No. 62/051,711, filed Sep. 17, 2014, both of which are incorporated herein by reference in their entirety.

BACKGROUND INFORMATION

Technical Field

The present disclosure relates generally to the field of digital cinematography, and more specifically to digital motion picture capture and rendering, and digital motion picture presentation in theaters, homes, and other venues.

Background Art

The term "digital cinematography" refers to working with videography and digital video. Digital imaging processing has made it possible to radically modify pictures from how they were originally captured. A cinematographer is responsible for the technical aspects of the images (lighting, lens choices, composition, exposure, filtration, film selection), but works closely with the director to ensure that the artistic features are supporting the director's vision of the story being told, from pre-production to post-production. Cinematography has a temporal aspect, and it is more complex than photography in terms of personnel management and logistical organization.

Digital cinema refers to the use of digital technology to distribute or project motion pictures as opposed to the historical use of motion picture film. A movie can be distributed via hard drives, the Internet, dedicated satellite links or optical disks such as DVDs and Blu-ray Discs. Digital movies are projected using a digital projector instead of a conventional film projector. In digital cinema, resolutions are represented by the horizontal pixel count, usually 2K (2048×1080 or 2.2 megapixels) or 4K (4096×2160 or 8.8 megapixels). In addition to the equipment already found in a film-based movie theater a DCI-compliant digital cinema screen requires a digital projector and a computer known as a "server", such as those available from Doremi Labs, Burbank, Calif. (USA). "DCI" refers to Digital Cinema Initiatives, a joint venture of the six major movie studios, which publishes a system specification for digital cinema. The specification ensures that 2K content can play on 4K projectors and vica-versa. Smaller resolutions in one direction are also supported (the image gets automatically centered). While much of the specification codifies work that had already been ongoing in the Society of Motion Picture and Television Engineers (SMPTE), the specification is important in establishing a content owner framework for the distribution and security of first-release motion picture content. See also the National Association of Theatre Owners (NATO) Digital Cinema System Requirements, addressing the requirements of digital cinema systems from the operational needs of the exhibitor. Please note that digital cinema differs from HDTV for theatrical presentations, which may be referred to as Electronic Cinema Systems (E-Cinema).

Use of large viewing angle film formats having the capacity to record and display images of fax greater size and resolution than conventional film systems, such as those known under the trade designation IMAX® and other large viewing angle formats, such as CINERAMA® with its concave panoramic screen, and partial 360 degree domes known as IMAX Dome or OMNIMAX have improved greatly the audience viewing experience.

Of late, 3-dimensional of "3D" films and theaters have given the viewer the ability to "see in 3D." To create the illusion of depth, the IMAX 3D process uses two separate camera lenses that represent the left and right eyes. The lenses are separated by a distance of 64 mm (2.5 in), the average distance between a human's eyes. Two separate rolls of film are used to capture the images they produce. By projecting the two films superimposed on the screen and using one of several available methods to direct only the correct image to each eye, viewers see a 3D image on a 2D screen. One method is to use polarizer filters to oppositely polarize the light used in projecting each image. The viewer wears glasses with polarizing filters oriented to match the projector filters, so that the filter over each eye blocks the light used to project the images intended for the other eye. In another method, the two projections rapidly alternate. While one image is being shown, the projection of its mate is blocked. Each frame is shown more than once to increase the rate and suppress flicker. The viewer wears shutter glasses with liquid crystal shutters that block or transmit light in sync with the projectors, so each eye sees only the images meant for it. Several of the early films that had been produced in digital 3D for release in conventional theaters were also presented in IMAX 3D.

No current tools address the unique operational challenges of existing theaters and other venues such as academic viewing rooms having standard, 2D flat screens or other viewing surfaces, such as walls. One idea may be to extending the viewable area of a traditional theater's front movie screen by introducing additional left and right canvases to gainfully alter the movie-going experience; however, this also increases the complexity needed to create new content and retrofit pre-existing films. Therefore movie theater owners have opted, in order to present a 3D viewing experience for such venues, either one of the methods described above (with the viewer wearing specially adapted glasses), or constructing modified venues to allow curved or dome viewing surfaces (screens, walls, etc.). The former has not been totally successful for a number of reasons (for example, people already wearing vision-correcting glasses), and the latter may not be feasible or even possible. Exhibitors such as theater owners may also wish to employ the walls of lobbies of the theater house for entertaining movie-goers waiting to enter the theater itself, or provide advertising space. Other exhibitors, such as academic providers and companies (such as resource exploration companies) may benefit from the 3D experience, but do not wish to expend funds building new venues or renovating old venues.

Having identified the above problems, it would be an advance in the cinematography art if methods, systems, and computer-readable media were available to reduce or overcome some or all of the above problems seen in currently available cinematic methods and systems. More specifically, it would be an advance in the cinematography art if methods, systems, and computer-readable media were available to retrofit existing venues so that viewers may enjoy the benefits of increased perspective, 3D viewing of entertaining, educational, or business content. In sum, prior to the present disclosure, 3-D animations have been mapped onto single planar surfaces (i.e. a flat screen) or onto a continuously curved screen (see for example U.S. Pat. No. 8,442,764), but the trick is to do this on an arrangement of three screens, where the two side screens are at angles to the main middle screen, such as would have to be the case in a cinema retrofit. U.S. Pat. No. 8,711,141 seems to disclose doing the reverse (generating a 3-D image or animation from a 2-D image or animation). No one has disclosed or taught how an animation or footage, originated or captured in 2D, 3D, or otherwise, may be processed to bake it into a forced perspective planar image and projected in planar format onto a tri-planar, tri-surface arrangement.

SUMMARY

In accordance with the present disclosure, methods, systems, and computer-readable media are described which reduce or overcome one or more of the above problems.

A first aspect of the disclosure is a method comprising:
digitally acquiring at least visual digital media content;
using a computer model simulation of a real venue in which the digital content is to be shown, frontally projecting the visual digital media content from a virtual center of the simulated venue, the real venue having a real frontal screen and two real oppositely positioned side screens;
digitally capturing the frontally projected visual digital media content from a point of view that a real frontal projector and each of two real oppositely positioned side projectors would have in real life in order to "bake in" a warped transformation of the frontally projected visual digital media content;
projecting the digitally captured, warped, transformed frontally projected visual digital media content through a real frontal digital projector and two real oppositely positioned side digital projectors in the real venue, thus completing an illusion of a "cinematic window" of the visual digital media content in the real venue; and
controlling the projecting using at least one digital server to feed the three digitally captured, warped media streams synchronously to the front, left and right digital cinema projectors.

A second aspect of the disclosure is a system comprising:
one or more digital cameras or a digital computer using a gaming engine for digitally originating (i.e., digitally acquiring) at least visual digital media content;
a computer using a computer model simulation of a real venue in which the digital content is to be showed, the real venue having a real frontal screen and two real oppositely positioned side screens, the computer model simulation virtually frontally projecting the visual digital media content from a virtual center of the simulated venue;
the computer programmed to digitally capture the frontally projected visual digital media from points of view of a digital projector projecting onto the frontal screen and two oppositely positioned side projectors projecting onto the side screens would have in real life in order to "bake in" a warped transformation of the frontally projected visual digital media;
a real frontal digital cinema projector and two real oppositely positioned side digital cinema projectors in the real venue, the real digital cinema projectors projecting the digitally captured, warped, transformed frontally projected visual digital media onto the real frontal screen and the real left and a right screen adjacent the frontal screen in the real theater that completes an illusion of a "cinematic window" of the visual digital media content in the real theater; and
at least one digital server to feed the three digitally captured, warped media streams synchronously to the front, left and right digital cinema projectors.

A third aspect of the disclosure is a system comprising:
a) a cinematic structure comprising a rear wall, a front wall, a floor, and left and right side walls;
b) a primary, forward projecting digital cinema projector positioned adjacent the rear wall for producing a primary digital image;
c) a primary reflecting screen upon which is projected the primary digital image, the primary reflecting screen having a left side edge and a right side edge;
d) at least one right side wall digital cinema projector for projecting at least one left side digital image onto a left side wall extension screen, the left side wall extension screen positioned with one edge adjacent the left side edge of the primary reflecting screen; and
e) at least one left side wall digital cinema projector for projecting at least one right side digital image onto a right side wall extension screen, the right side wall extension screen positioned with one edge adjacent the right side edge of the primary reflecting screen, wherein the left and right side digital images are created using the system of the second aspect and/or the system of the second aspect.

A fourth aspect of the disclosure is a method comprising:
a) providing a cinematic structure comprising a rear wall, a front wall, a floor, and left and right side walls;
b) providing a primary reflecting screen on the front wall, the primary reflecting screen having a left side edge and a right side edge;
c) projecting a major portion of a primary digital image onto the primary reflecting screen using a primary digital cinema projector positioned adjacent the rear wall;
d) projecting a second digital image using a right side wall digital cinema projector, the second digital image comprising a forced perspective left side digital image extension of the primary digital image projected onto a left side wall extension screen, the latter positioned with one edge adjacent the left side edge of the primary reflecting screen; and
e) projecting a third digital image using a left side wall digital cinema projector, the third digital image comprising a forced perspective right side digital image extension of the primary digital image projected onto a right side wall extension screen, the latter positioned with one edge adjacent the right side edge of the primary reflecting screen;
wherein the forced perspective left and right side digital image extensions are created using the method of the first aspect and/or the system of the second aspect.

A fifth aspect of the disclosure is a system for mapping media including at least one of 3-D animation, film, video, digital media or footage onto a tri-planar surface, the system comprising:
a) a structure comprising a primary light reflecting surface and left and right extension light reflecting surfaces positioned in abutting edge relationship to opposite vertical side edges of the primary light reflecting surface, and positioned at respective first and second angles to the primary light reflecting surface, the first and second angles each being greater than 90 degrees, thus forming a tri-planar surface;
b) a primary, forward projecting digital cinema projector positioned to produce a primary digital image on the primary light reflecting surface;

c) a right side digital cinema projector for projecting a left side digital image onto the left extension surface light reflecting screen; and d) a left side digital cinema projector for projecting a right side digital image onto the right extension surface light reflecting screen;

wherein the primary light reflecting surface and left and right extension light reflecting surfaces form the tri-planar surface upon which is mapped a 3-D animation or film footage produced by the combination of images produced by the primary, forward projecting digital cinema projector, the right side digital cinema projector, and the left side digital cinema projector, and wherein the primary, left and right side digital images are created using the system of the second aspect and/or the system of the second aspect.

A sixth aspect of the disclosure is a method of mapping media including at least one of 3-D animation, film, video, digital media or footage onto a tri-planar surface, the method comprising:

a) providing a structure comprising a primary light reflecting surface and left and right extension light reflecting surfaces positioned in abutting edge relationship to opposite vertical side edges of the primary light reflecting surface, and positioned at respective first and second angles to the primary light reflecting surface, the first and second angles each being greater than 90 degrees;

b) projecting a primary digital image on the primary light reflecting surface using a primary, forward projecting digital cinema projector;

c) projecting a second digital image onto the left extension light reflecting surface using a right side digital cinema projector; and d) projecting a third digital image onto the right extension light reflecting surface using a left side digital cinema projector;

thereby mapping media selected from the group consisting of 3-D animation, film, video, digital media, and footage produced by the combination of images produced by the primary, forward projecting digital cinema projector, the right side digital cinema projector, and the left side digital cinema projector onto a tri-planar surface formed by the primary light reflecting surface and left and right extension light reflecting surfaces, and wherein the primary, second and third digital images are produced using the method of the first aspect and/or the system of the second aspect.

A seventh aspect of the disclosure is a system comprising:

a) a structure comprising a rear wall, a front wall, a floor, and left and right side walls;

b) a primary, forward projecting digital cinema projector positioned adjacent the rear wall for producing a primary digital image;

c) a primary reflecting screen upon which is projected the primary digital image, the primary reflecting screen having a left side edge and a right side edge;

d) at least one right side wall digital cinema projector for projecting a second digital images, the second digital image projected onto a left side wall extension screen, the latter positioned with one edge adjacent the left side edge of the primary reflecting screen;

e) at least one left side wall digital cinema projector for projecting a third digital image, the third digital image projected onto a right side wall extension screen, the latter positioned with one edge adjacent the right side edge of the primary reflecting screen; and f) at least one digital server to feed at least three separate media streams synchronously to the front, left and right digital cinema projectors.

An eight aspect of the disclosure is a system for mapping at least one of 3-D animation, film, video, digital media or footage onto a tri-planar surface comprising:

a) a structure comprising a primary light reflecting screen and left and right extension light reflecting screens positioned in abutting edge relationship to opposite vertical side edges of the primary light reflecting screen, and positioned at respective first and second angles to the primary light reflecting screen, the first and second angles each being greater than 90 degrees, thus forming a tri-planar surface;

b) a primary, forward projecting digital cinema projector positioned to produce a primary digital image on the primary light reflecting screen;

c) a right side digital cinema projector for projecting a second digital image onto the left extension screen light reflecting screen; and d) a left side digital cinema projector for projecting a third digital image onto the right extension screen light reflecting screen; and e) at least one digital server to feed at least three separate media streams synchronously to the front, left and right digital cinema projectors;

wherein the primary light reflecting screen and left and right extension light reflecting screens form the tri-planar surface upon which is mapped at least one of 3-D animation, film, video, digital media or footage produced by the combination of images produced by the primary, forward projecting digital cinema projector, the right side digital cinema projector, and the left side digital cinema projector.

Other aspects of the disclosure are computer-readable media encoded with processing instructions for implementing the various methods with the systems.

Methods, systems, and computer-readable media of this disclosure will become more apparent upon review of the brief description of the drawings, the detailed description of the disclosure, and the claims that follow. It should be understood that wherever the term "comprising" is used herein, other embodiments where the term "comprising" is substituted with "consisting essentially of" are explicitly disclosed herein. It should be further understood that wherever the term "comprising" is used herein, other embodiments where the term "comprising" is substituted with "consisting of" are explicitly disclosed herein. Moreover, the use of negative limitations is specifically contemplated; for example, certain systems, methods, and computer-readable media may comprise a number of physical hardware and software components and features, but may be devoid of certain optional hardware and/or software and/or other features, such as one or more sidewalls or roofs of structures. As another example, certain servers suitable for use herein may include software and hardware components pertinent to particular end uses, but may be devoid of other components and/or software, depending on the wishes of the design, facility owner, or other end user. Computers and servers may, in certain embodiments, be devoid of any other use than for use in or with the aspects of this disclosure.

BRIEF DESCRIPTION OF THE DRAWINGS

The manner in which the objectives of the disclosure and other desirable characteristics can be obtained is explained in the following description and attached drawings in which.

Figure 1:
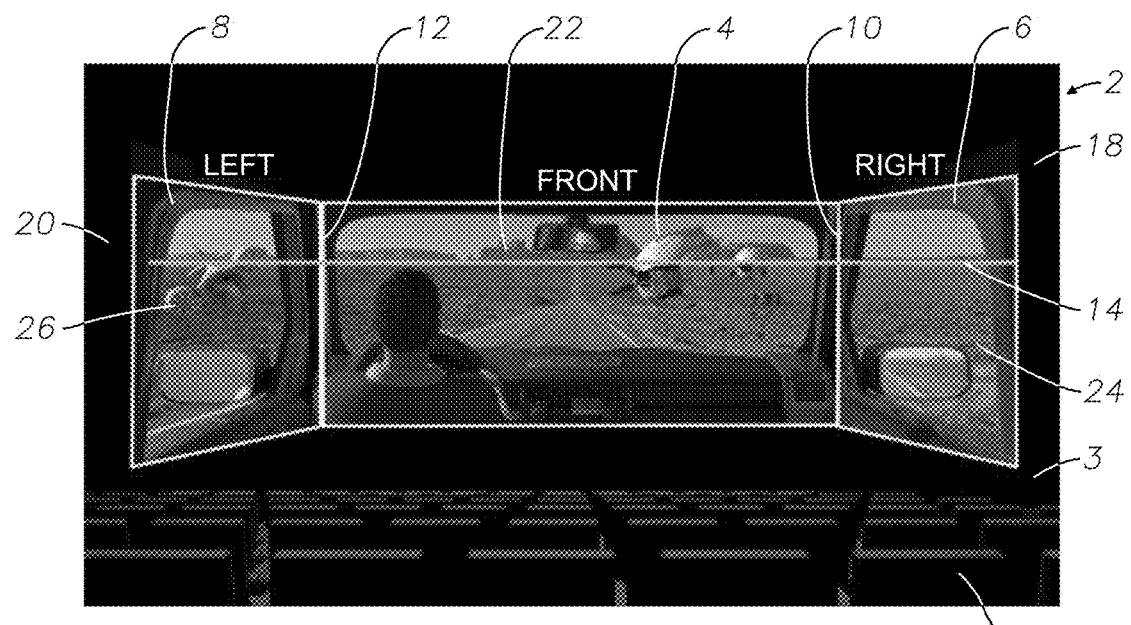
FIGS. 1-15 are schematic views of how a standard flat screen theater may be retrofitted in accordance with of the present disclosure.

It is to be noted, however, that the appended drawings are not to scale and illustrate only typical embodiments of this disclosure, and are therefore not to be considered limiting of its scope, for the disclosure may admit to other equally effective embodiments.

DETAILED DESCRIPTION

In the following description, numerous details are set forth to provide an understanding of the disclosed systems and methods. However, it will be understood by those skilled in the art that the systems and methods covered by the claims may be practiced without these details and that numerous variations or modifications from the specifically described embodiments may be possible and are deemed within the claims. All U.S. published patent applications and U.S. Patents referenced herein are hereby explicitly incorporated herein by reference. In the event definitions of terms in the referenced patents and applications conflict with how those terms are defined in the present application, the definitions for those terms that are provided in the present application shall be deemed controlling.

As explained briefly in the Background, no current tools address the unique operational challenges of existing theaters and other venues such as academic viewing rooms having standard, 2D flat screens or other viewing surfaces, such as walls. Solutions have included the viewer wearing special glasses, or the venue owner constructing modified venues to allow curved or dome viewing surfaces (screens, walls, etc.). It would be an advance in the cinematography art if methods, systems, and computer-readable media were available to reduce or overcome some or all of the above problems seen in currently available cinematic methods and systems. More specifically, it would be an advance in the cinematography art if methods, systems, and computer-readable media were available to retrofit existing venues so that viewers may enjoy the benefits of increased perspective, 3D viewing of entertaining, educational, or business content.

Various terms are used throughout this disclosure. As used herein the terms "render" and "rendering" mean essentially mixing all components into a final, single continuous clip that can be shared, edited, uploaded or archived. Rendering is generally synonymous with completing, saving, or exporting a file, and a colorful analogy might be "baking your cake". The term "bake in" is similar but refers to adjusting an image or a clip with a non-reversible added element of the initial capture of an image. For instance when baking shadows into an image, they will be set at an angle and when changing the position of the key light or sun will not change the shadow angle—in other words, meaning the shadows are baked in.

The term "digital media content" as used herein means simply content generated using a programmed digital computer or one or more digital cameras. The term "surface" includes screen, wall, roof, side of a building, ceiling, and portions of any of these.

The phrase "computer model simulation" as used herein means using an open-source or other publicly available (for profit or not) version of software with a digital computer so that the computer will be modified to be able to animate or mimic lighting, projection in a virtual venue, or physical features of a venue. Several examples are provided in the following paragraphs. One such software is known as CINEMA 4D® (from MAXON Computer GmbH), which software allows 3D modeling, animation, rendering, post-production, interactive creation and playback. The software known as CINEMA 4D includes options for 3D unwrapping, shading, physics, dynamics and particles, real time 3D/game creation, and camera projection shading. Tools are also included for 2D and 3D procedural brushes, edge rendering, collision simulation, and the like. Many 2D and 3D file formats are supported. Commercially available simulation software packages include those known under the trade designations AUTODESK MAYA™, a 3D computer graphics software that currently runs on digital computer operating systems known under the trade designations MICROSOFT® WINDOWS®, APPLE® OS X™, and LINUX®, originally developed by Alias Systems Corporation (formerly Alias/Wavefront) and currently owned and developed by Autodesk, Inc. It is used to create interactive 3D applications, including video games, animated film, TV series, or visual effects.

The game engine known under the trade designation CRYENGINE® is a game engine designed by the German game developer Crytek GmbH. It has been used in all of their titles with the initial version being used in the first-person shooter video game known as FAR CRY™, and continues to be updated to support new consoles and hardware for their games. It has also been used for many third-party games under Crytek's licensing scheme, including SNIPER: GHOST WARRIOR 2™ and SNOW™. Ubisoft, Inc. maintains an in-house, heavily modified version of the game engine known under the trade designation CRYENGINE from the original FAR CRY™ called the DUNIA™ ENGINE, which is used in their later iterations of the FAR CRY™ series.

The 3D modeling software known as 3DS MAX® provides a comprehensive modeling, animation, simulation, and rendering solution for games, film, and motion graphics artists. The software known as 3DS MAX delivers efficient new tools, accelerated performance, and streamlined workflows to help increase overall productivity for working with complex, high-resolution assets.

The game engine known under the trade designation UNREAL™ or THE UNREAL ENGINE™ is a game engine developed by Epic Games, Inc. first showcased in the 1998 first-person shooter game UNREAL™. Although primarily developed for first-person shooters, it has been successfully used in a variety of other genres, including stealth, MMORPGs, and other RPGs. With its code written in C++, the Unreal Engine features a high degree of portability and is a tool used by many game developers today.

The software known as MODO® is a polygon and subdivision surface modeling, sculpting, 3D painting, animation and rendering package developed by Luxology, LLC, which is now merged with and known as The Foundry Group, LLC. The program incorporates features such as n-gons and edge weighting, and currently runs on digital computer operating systems known under the trade designations MICROSOFT® WINDOWS®, APPLE® OS X™, and LINUX®.

The software known under the trade designation Unity® (from Unity IPR ApS, Denmark) is a game development ecosystem, a rendering engine fully integrated with a complete set of intuitive tools and rapid workflows to create interactive 3D and 2D content, and allows multiplatform publishing, allows use of thousands ready-made assets available form an online store known as the ASSET STORE™, and a knowledge-sharing community. The software currently runs on digital computer operating systems known under the trade designations MICROSOFT® WINDOWS®, APPLE® OS X™, and LINUX®.

The software known under the trade designation HOUDINI™ is a high-end 3D animation application software developed by Side Effects Software, Inc., of Toronto, Canada. Side Effects adapted HOUDINI™ from the PRISMS™ suite of procedural generation software tools. Its exclusive attention to procedural generation distinguishes it from other 3D computer graphics software. The software known under the trade designation HOUDINI™ has been used in various feature animation productions, including the following: the DISNEY® feature films CHICKEN LITTLE™ and FROZEN™; the film RIO™, a Blue Sky Studios film; and the feature animation ANT BULLY™.

The software known under the trade designation NUKE™ is a node-based digital compositing software produced and distributed by The Foundry Group, LLC, and used for film and television post-production. The software currently runs on digital computer operating systems known under the trade designations MICROSOFT® WINDOWS®, APPLE® OS X™, and LINUX®. The software's users include Digital Domain™, Walt Disney® Animation Studios, DREAMWORKS® Animation LLC, Sony™ Pictures Imageworks™, Sony Pictures Animation, Framestore, Weta Digital and Industrial Light & Magic. The software has been used on productions such as AVATAR™, MR. NOBODY™, THE CURIOUS CASE OF BENJAMIN BUTTON™, KING KONG™, JUMPER™, I, ROBOT™, RESIDENT EVIL: EXTINCTION™, TRON: LEGACY™, ALICE IN WONDERLAND™, BLACK SWAN and THE HOBBITT™.

The software known under the trade designations PHOTOSHOP® and ILLUSTRATOR®, from Adobe Systems Inc. may be used. The software PHOTOSHOP has become the de facto industry standard in raster graphics editing, such that the terms "photoshopping" and "photoshop contest" were born. It can edit and compose raster images in multiple layers and supports masks, alpha compositing and several color models including RGB, CMYK, Lab color space (with capital L), spot color and duotone. The software has vast support for graphic file formats but also uses its own PSD and PSB file formats which support all the aforementioned features. In addition to raster graphics, it has limited abilities to edit or render text, vector graphics (especially through clipping path), 3D graphics and video. The software's featureset can be expanded by plug-ins, programs developed and distributed independently of Adobe Systems, Inc., that can run inside it and offer new or enhanced features.

"Computer" as used herein includes, but is not limited to, devices selected from the group consisting of a hand-held computer, a laptop computer, a desktop computer, and a tablet computer.

"Server" as used herein includes special electronic devices, similar to a computer, but more powerful and having DCI-specific hardware and software features when the system or method is used in commercial theaters. A DCI-compliant server may not be required in some venues, so the term includes non-DCI-compliant servers. "DCI" refers to "Digital Cinema Initiative", a standards setting group formed by major movie production houses.

Certain system embodiments of this disclosure may include wherein the floor slopes downward from the rear wall to the front wall at an angle ranging from 0 to about 30 degrees measured to horizontal. Certain system embodiments of this disclosure may include wherein the primary, the right side, and the left side digital cinema projectors each transmit an image at a resolution, represented by horizontal pixel count, of at least 2K (2048×1080 or 2.2 megapixels), more preferably at least 4K (4096×2160 or 8.8 megapixels). Certain system embodiments of this disclosure may include wherein each of the digital cinema projectors are selected form the group consisting of DLP and laser cinema projectors. Certain systems and methods of this disclosure may comprise an auxiliary right side digital projector projecting an auxiliary digital image onto a left side auxiliary screen separated from the left side extension screen, and an auxiliary left side digital projector projecting a right side auxiliary digital image onto a right side auxiliary screen separated from the right side extension screen. Certain method embodiments of this disclosure may include methods wherein the identifying of potential simultaneous operational conflicts using a tabular output format displayed on a user interface electronically connected to the computer comprises a user using a wireless connection between the user interface and the computer. (As used herein the phrase "electronically connected" means either wireless, wired, or both.) Certain embodiments of this disclosure may include systems and methods wherein the server computer supports JPEG2000 and MPEG2 files, and dual-projector 3D playback. Certain embodiments of this disclosure may include systems and methods wherein the primary light reflecting surface and left and right extension light reflecting surfaces are rectangular. Certain embodiments of this disclosure may include systems and methods wherein at least one of the surfaces is a light reflecting screen. Certain embodiments of this disclosure may include systems and methods wherein at least one of the surfaces is a wall, for example, but not limited to, a wall of a movie theater or lobby of a movie theater. Certain embodiments of this disclosure may include systems and methods wherein the primary light reflecting surface and left and right extension light reflecting surfaces are rectangular. Certain method embodiments of this disclosure may include methods wherein the computer is selected from the group consisting of a hand-held computer, a laptop computer, a desktop computer, and a tablet computer.

In the specific context of the present disclosure, certain methods and computer-readable media (referred to alternatively as "software" herein) of the present disclosure may be referred to as TRAPPERVISION™, although this disclosure is explicitly not so limited. The software currently known under the trade designation TRAPPERVISION™ was developed to meet certain unique needs of retrofitting existing movie theaters and other venues where the owners wish to work within the existing venue structure. In certain embodiments, the software may comprise features similar to those described above with reference to software commercially available discussed herein. To facilitate ease of use getting data in and out to conform with perceived perspective using software embodiments such as that known under the trade designation TRAPPERVISION™, a back-end system, such as the software and hardware known under the trade designation PANDORAS BOX SERVER, from COOLUX® Media Systems GmbH, may be employed. This back-end software and hardware provides a turnkey solution that perfectly unites state of the art rendering technology with intuitive media and show control, and provides a high-quality server featuring the most powerful render-engine, offering real-time compositing in 3D and allows for projection onto any shape and any surface. The systems allow arranging videos and images freely, changing color, form and position, and synchronize all video and audio sources, and allows on-site 3D rendering, composition and editing for any live event or multi-media show. Another back-end system, such as the software and hardware known under the trade designation GREEN HIPPO™ (from Green Hippo, London, England) may be used to provide high resolution, multi-screen, multi-server displays. However, high-resolution media encoding, due to the substantial size of the source media, is a major task for any server to undertake, especially when programming a show whilst encoding simultaneously.

As used herein the phrase "Digital Cinema Package" (DCP) is a collection of digital files used to store and convey digital cinema (DC) audio, image, and data streams. The term has been defined by Digital Cinema Initiatives, LLC in their recommendations for packaging of DC contents. General practice adopts a file structure that is organized into a number of usually multi-gigabyte size Material eXchange Format (MXF) files, which are separately used to store audio and video streams, and auxiliary index files in XML format. The MXF track files contain image and audio essence that are compressed and encoded in order to reduce the huge amount of required storage. Encryption is an optional solution and is used to protect from unauthorized use. The image track file contains compressed JPEG 2000 essence and the audio is a wrapped 24 bit linear PCM multichannel WAV file. The adopted (optional) encryption standard is AES 128 bit in CBC mode. The newer SMPTE (Society of Motion Picture & Television Engineers) standards are used to conform the recommendations among different tool vendors and producers. Legacy DCP standard, MXF and DPX, file to the software known under the trade designation TRAPPERVISION™.

Specific non-limiting system, method, kit, and computer-readable media embodiments in accordance with the present disclosure will now be presented in conjunction with FIGS. 1-18 and FIGS. 19A and 19B. The same numerals are used for the same or similar features in the various figures. In the views illustrated in FIGS. 1-17 it will be understood in each case that the figures are schematic in nature, and certain conventional features are not illustrated in order to illustrate more clearly the key features of each embodiment.

Example 1

Extending the Viewable Area of a Traditional Theater's Front Movie Screen

As noted previously, extending the viewable area of a traditional theater's front movie screen by introducing additional left and right canvases not only gainfully alters the movie-going experience, but also increases the complexity needed to create new content and retrofit pre-existing films. An extended tri-screen canvas increases a viewer's immersion by engaging the viewer's peripheral vision. While other various approaches have achieved a level of this, notably the system known as IMAX® (Imax Corporation, Mississauga, Ontario, Canada) with its large screen, and CINERAMA® (Cinerama, Inc., Los Angeles, Calif.) with its concave panoramic screen, our approach in this embodiment is uniquely designed to be retrofitted into existing traditional theaters and similar venues thus negating the need for specialized build-outs and allowing for venue owners to capitalize further on their existing spaces.

Once the additional screens and projectors have been setup to extend the canvas, several steps need to be taken at the content creation level (sometimes referred to herein as "origination") in order to create the illusion of one continuous viewing angle. Full immersion for the viewer comes not when separate content for the side screens is shown simultaneously as the front screen, but when the side screens' content is altered using a method to force the perspective aiming it at the audience's point of view.

How this is achieved is now explained using FIGS. 1-14. In most traditional theaters (FIG. 1, at least circa September 2014), both the audience and the projectors face the screen perpendicularly, essentially sharing the same point of view. The side screen projectors are aimed perpendicularly to the left and right screens respectively. Since they are viewed from the seating area at a much steeper angle, the side content must be skewed to accommodate a viewing angle that would seem to the viewer to be a continuation of the front screen.

While the treatment for content originally generated for tri-screen differs slightly than content needing retrofitting, the concept is the same. Rather than seeing the screens as a left, front, and right screen, a fully immersive experience would allow them to be viewed as windows looking out into the cinematic world, as if the viewers are focusing beyond the screens. To do this, the content needs to be created or captured (originated) with a much wider viewing angle than by traditional origination means.

Step 1: During acquisition of 3D animation and film footage, content is acquired by shooting or rendering using one of the following embodiments, illustrated schematically in the enumerated FIGS. 2-4:
  a) single spherical lens (FIG. 2);
  b) single ultra-wide and high-resolution (minimum 8 k) digital camera (FIG. 3); or
  c) three individual digital cameras (FIG. 4).

Figure 4:
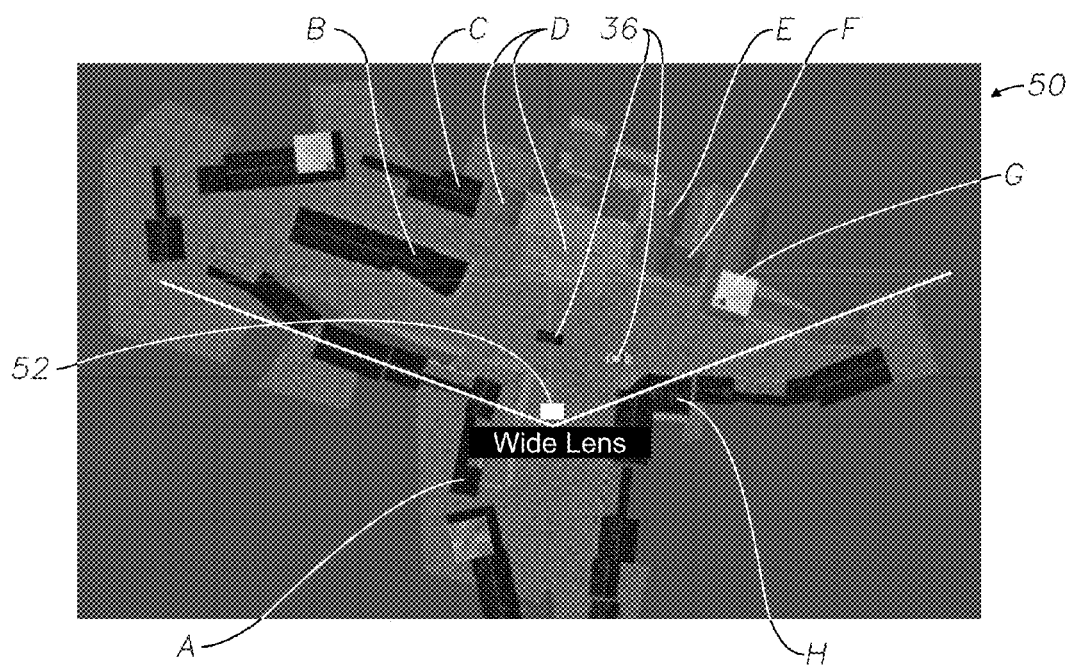
Figure 5:
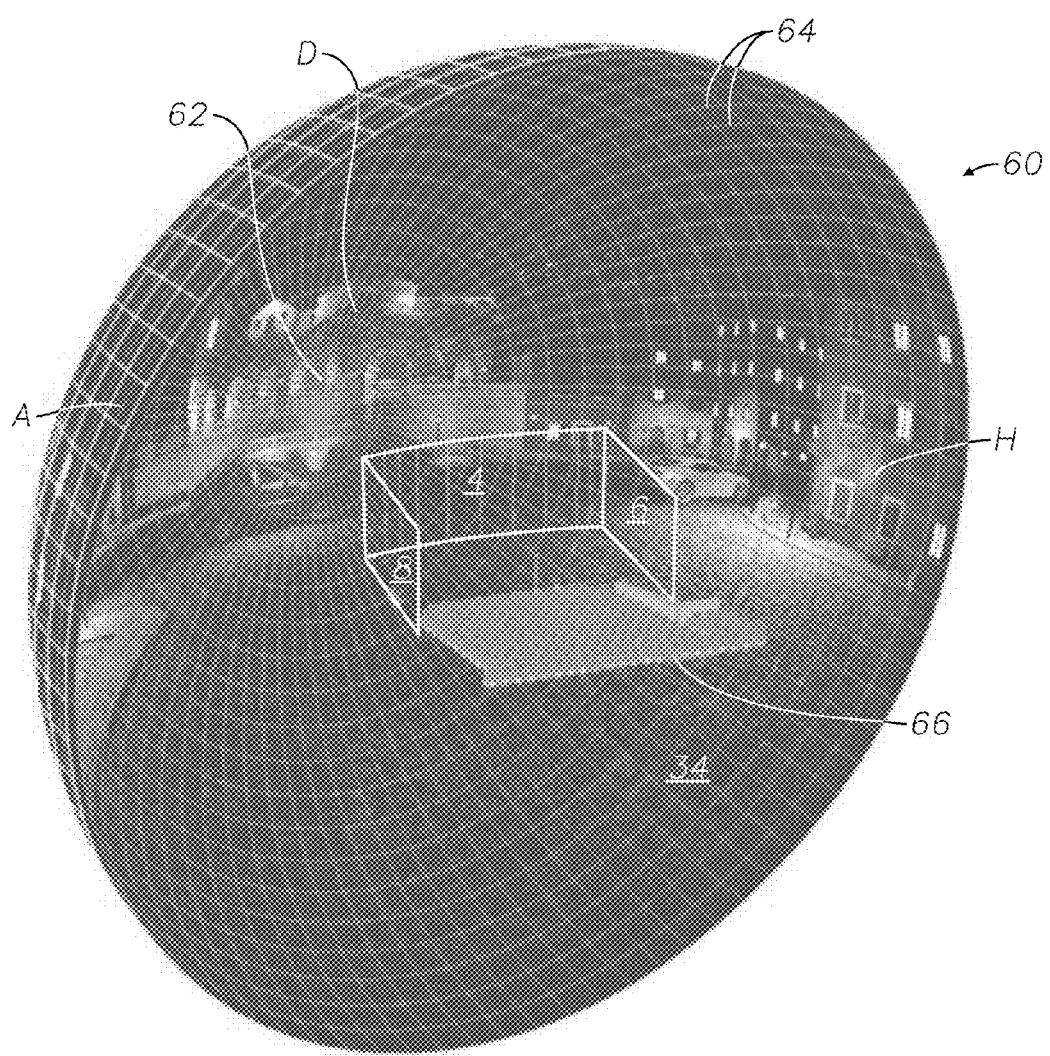
Figure 6:
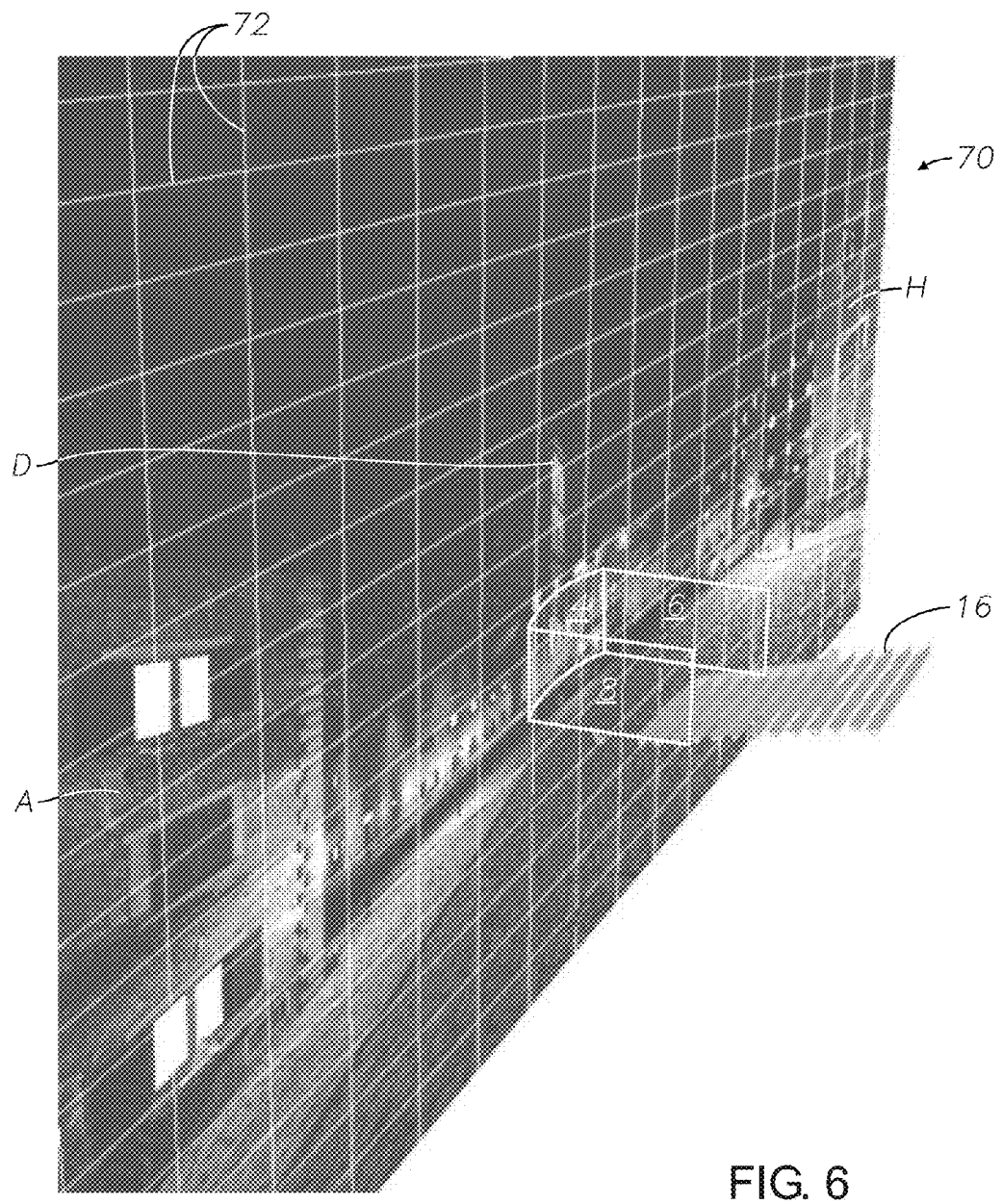
Figure 7:
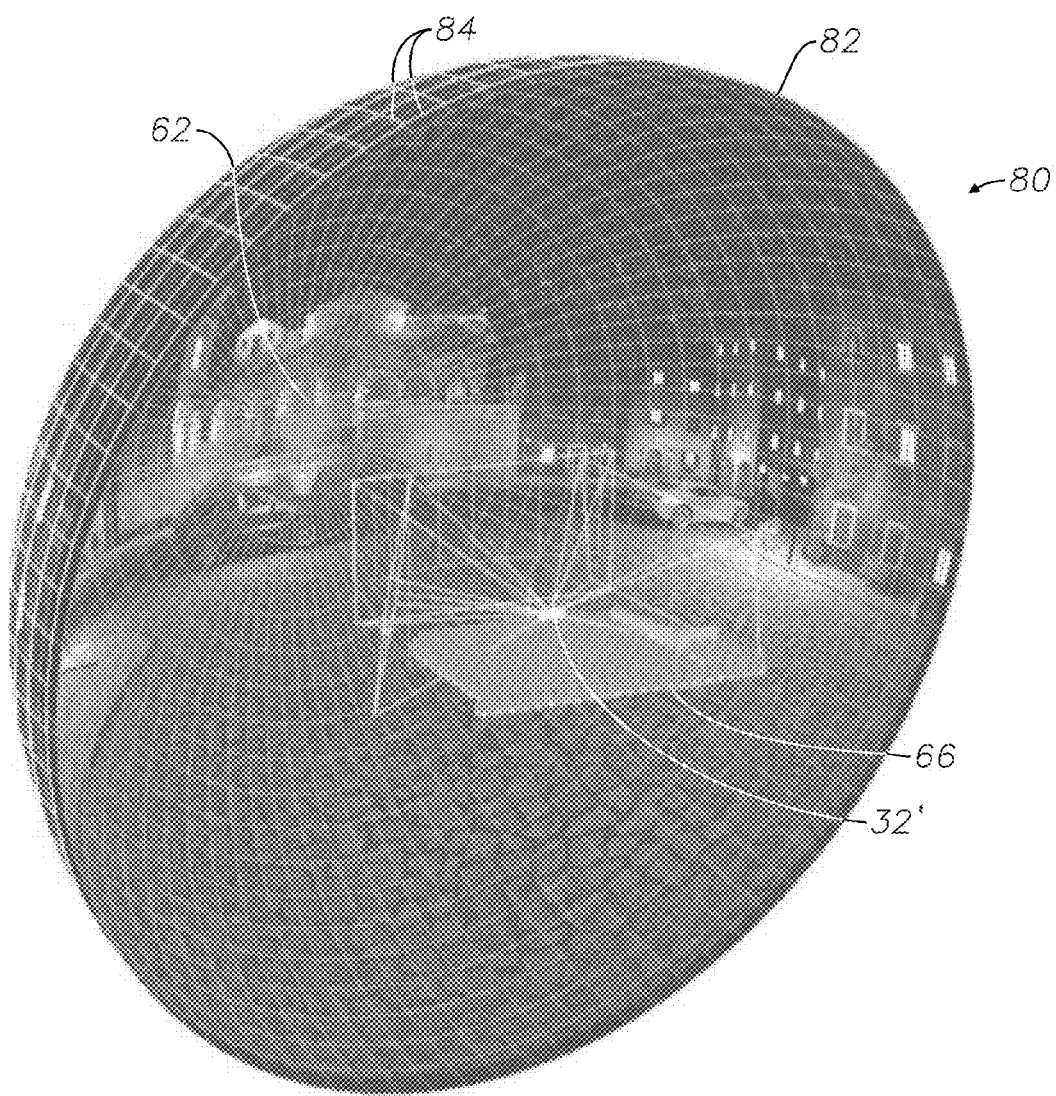

When shooting or rendering with three individual (real or virtual) cameras as in the embodiment illustrated schematically in FIG. 4, the cameras must be arranged in such a way that a single shared focal point is achieved behind the individual focal points of the respective cameras. The lens angles must be the same on all three cameras and with minimal overlap of the footage. (In these embodiments, to generate media with three individual cameras, one would go directly to Step 4.) The focal point of shooting or rendering as described in Step 1a) to 1c) represents the center of the theater.

Figure 8:
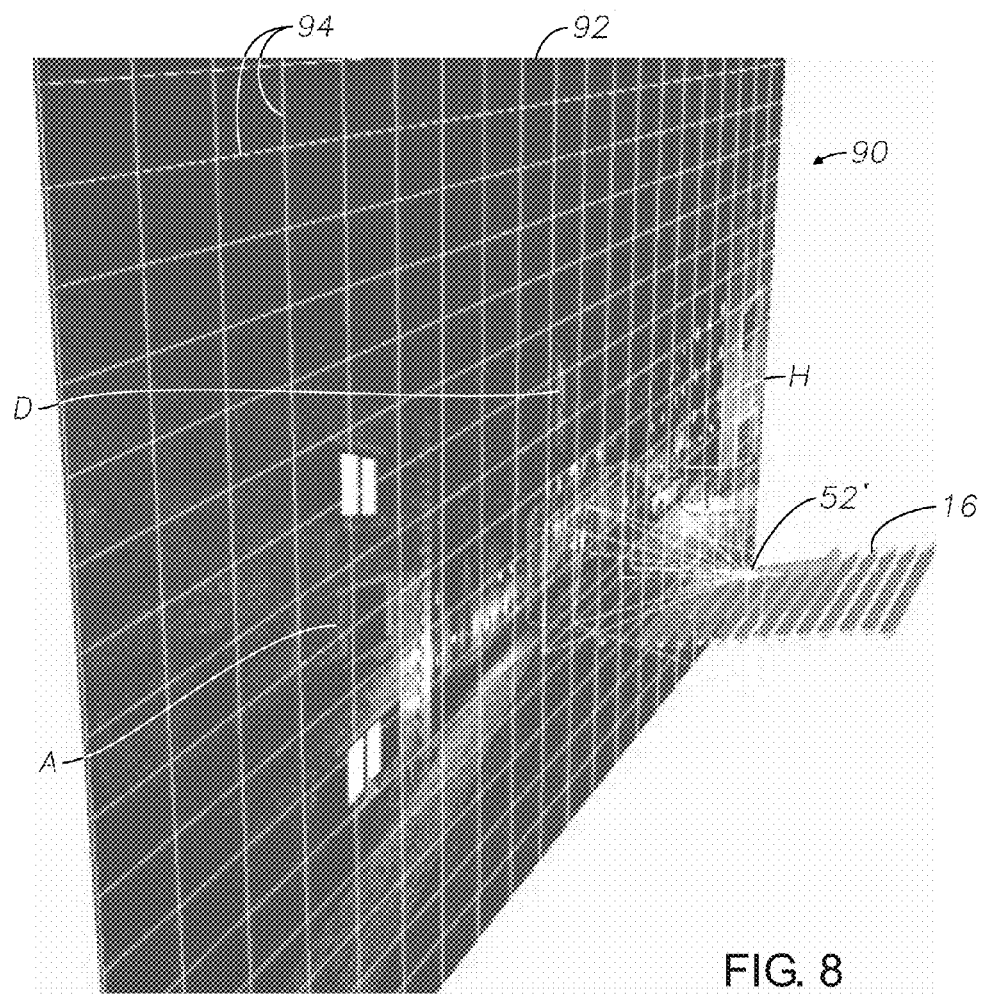

Step 2: In certain embodiments using the techniques of either Step 1a or 1b, the footage, digital media, or renderings of the spherical lens (see FIG. 5) or the single ultra-wide high-resolution digital camera lens (see FIG. 6) are then fed into a 3D computer model simulation of the three screens (see FIGS. 7 and 8, respectively). Using the computer model simulation, the footage, digital media, or renderings of the spherical lens or the single ultra-wide high-resolution digital camera lens is projected onto the same surface as it was acquired in originally. In other words, the footage, digital media, or renderings of the spherical lens (FIG. 5) is projected onto a virtual spherical screen (FIG. 7), or the footage, digital media, or renderings of the single ultra-wide high-resolution digital camera lens (FIG. 6) is projected onto a virtual wide frame (FIG. 8).

Figure 9:
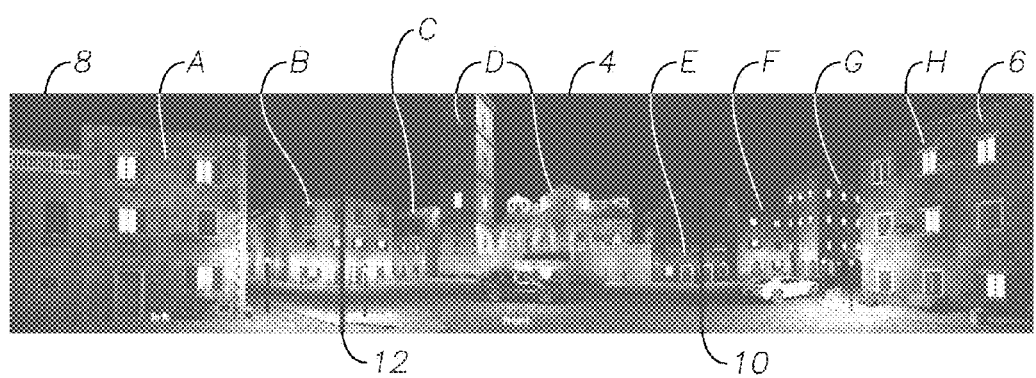
Figure 10:
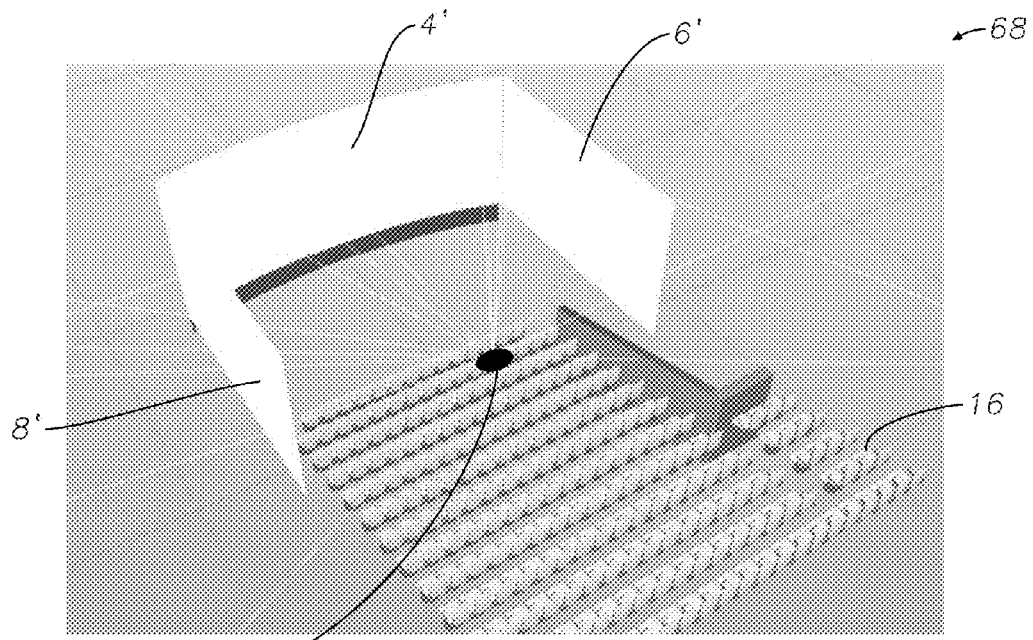
Figure 11:
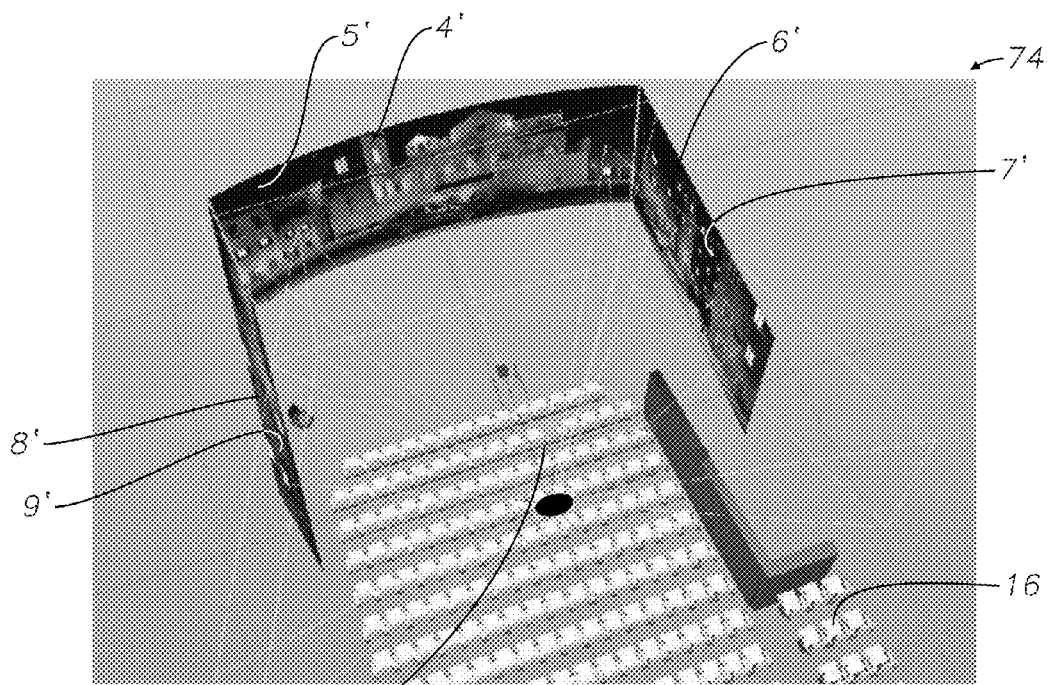

Step 3: Using the same virtual three-camera rig as described in Step 1: Three individual cameras. When generating or rendering content with three individual cameras, the cameras must be arranged in such a way that a single shared focal point is achieved behind the individual focal points of the respective cameras. The lens angles must be the same on all three cameras and with minimal overlap of the footage. The result of Steps 1c and 3 will appear as illustrated in FIG. 9.

Step 4: The three individual media pieces, Left/Center/Right are then fed into a 3D computer simulation, modeled with three screen places as they would be in a movie theater (referring to FIG. 10). A render or perspective position to place the three cameras will be in the center of the virtual theater and moved backwards or forwards virtually to match the best viewing position, or to accommodate the viewing angles to accommodate the footage or rendering angles.

Figure 12:
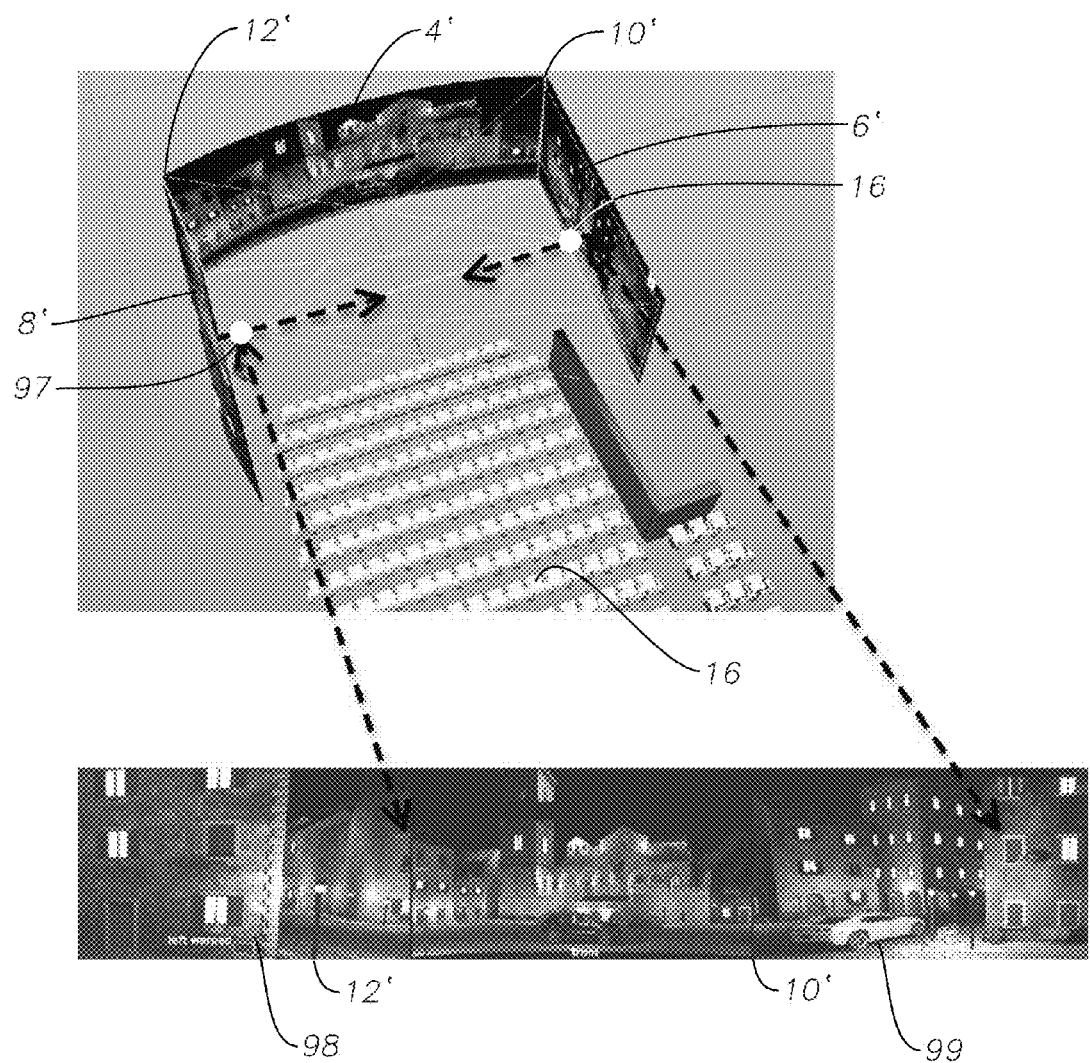

Step 5: As illustrated schematically in FIG. 11, the digital media is then virtually "projected" from the center of the theater onto their respective virtual screens. A virtual left projector (positioned to the right of the center or frontal screen) projects onto the virtual left screen, and a virtual right projector (positioned to the left of the center or frontal screen) projects onto the virtual right screen, respectively. This will project or "texture" the virtual media onto the virtual screens with the proper perspective from the middle of the theater's vantage or best viewing position. Much like how a slide projector works in the real world, the virtual media is virtually projected from the virtual center of the virtual 3D theater's seats from the front, left, and right virtual projectors onto the geometry of the three virtual screens. This electronically "bakes" or "burns" the forced perspective onto the virtual side screens. Referring to FIG. 12, we then capture the forced perspective images that were electronically "baked" or "burned" onto the virtual side screens. To perform the capture, we then render the "baked" forced perspective using virtual cameras placed perpendicular to the screens, duplicating the projector placement in the actual theater in the real world facing the screens. This 3D virtual frontal projection and capture warps and distorts the content on the side screens, resulting in forced perspective on left and right screens.

Figure 13:
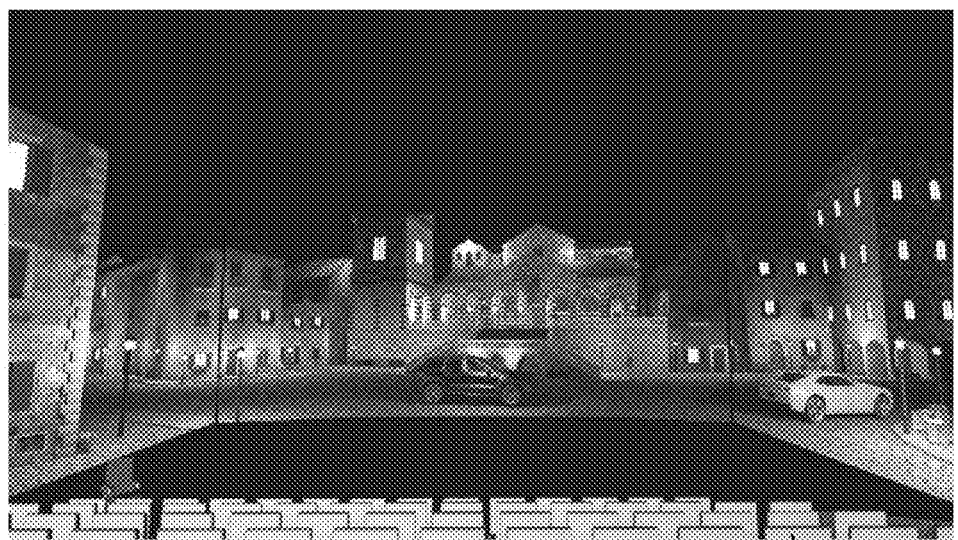

When playing back ("projecting") the forced perspective virtual content from actual, real world perpendicular projectors in the theater, the perspective would be corrected when viewed from in the theater, as illustrated in FIG. 13. In other words, it will now appear as one large extended panoramic image.

Figure 14:
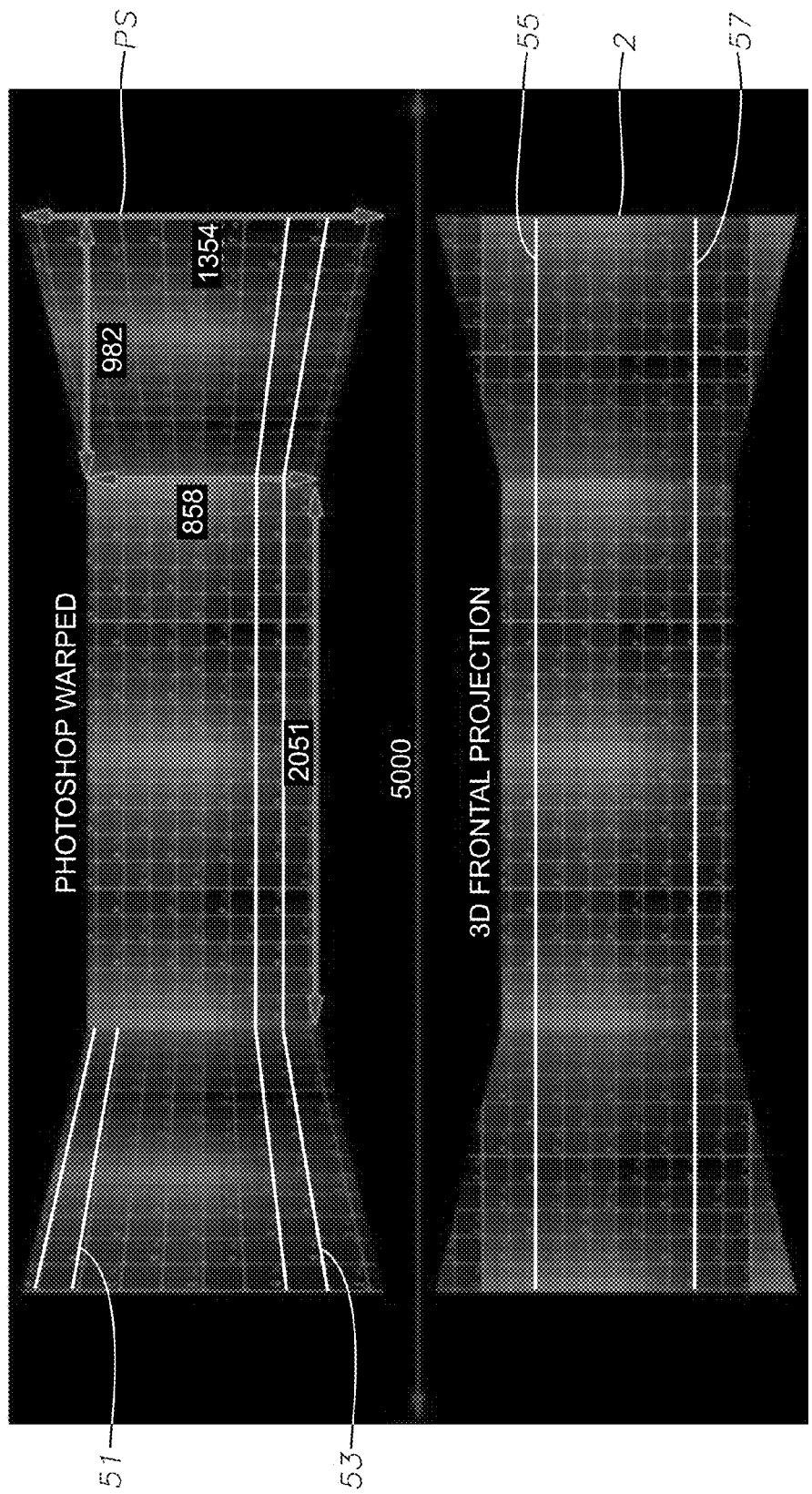

The methods of the present disclosure differ greatly from prior art methods of recording the media and frontally projecting each screen with their own projectors, as in FIG. 14, top. Seen from the center of the theater, the prior art approach (FIG. 14, top) is the equivalent of corner pinning the outer most edges of the media to fill the screen canvas, and fails to maintain the illusion of a "window" to the cinematic world and the content will seem to be foreshortened when viewed from an angle The images in FIG. 14 illustrate the discrepancy between the two methods, with the top image illustrating schematically the result of the prior art methods, and the lower image in FIG. 14 illustrating the result of the methods of the present disclosure.

After digital acquisition of the digital media using the computer model simulation of the existing theater, frontally projecting the digital media from the virtual center of the simulated theater is the first step. The second essential step is to digitally capture this projection from the point of view that each side projector would have in real life in order to "bake in" the warped transformation. It is this baked in media, that when projected back out through the actual side projectors in the real theater that will complete the illusion of the "cinematic window". In sum, for this Example, there are a minimum of three steps: the first step is to originate the three angles (importantly, the origination (pre-warped media of any type, whether content created by computer with a gaming engine or created with one or more digital cameras) is not limited to 3D); the second step is to virtually re-project the first render from the center of the virtual theater; and the third step is to digitally capture the warped side screens (post-warped media). In other words, we process the pre-warped media to bake it into a forced perspective planar image, so by the time the post-warped content is projected onto a tri-planar surface it's all planar.

Example 2: Showing How the Perspective of the Planar Images Needs to be Warped

A typical case may be exemplified by a designer wishing to split an existing 2D wide image (5000 px wide) across three screens, (a center screen and two side screens adjacent the center screen, and on side walls of a theater) so that perspective is pre-corrected in the image.

Using prior art methods, a designer might keep the center (cropped to 2051 px) portion unchanged, and attempt to "warp" the outer edges simply by creating a trapezoidal 2D shape on each side (similar to FIG. 14, top view). In this attempt, the active area of the center and particularly the outer side of the edge screens would be appreciated. If the designer presumes the image is 858 px tall natively (which results in a ~2.39:1 aspect for the center screen), and that the inner seam of the edge screens matches this vertical dimension of 858 px, the designer wishes to know what would the outer edge vertical dimension (in pixels or "px") of each trapezoid of the side screens be?

In this example, the designer's picture has perspective and lens distortion baked in already, so it's what the viewer will experience. The only distortion necessary is slight expansion of the horizontal width to counter the elongation you will get from an acute viewing angle. So the outer vertical height dimension of the center screen will remain 858 px, but the horizontal width would be expanded to on the side screens to accommodate this. The exact amount, usually about 15%, is determined by a computer model (as illustrated in FIG. 14) to project and render the right amount of distortion. This is dependent on the angles $\alpha$ and $\beta$ of the actual screens in the real world (angles $\alpha$ and $\beta$ are discussed herein in reference to FIGS. 16 and 17).

Stated differently, in this Example the designer wishes to take an existing 5000×858 image and transform the sides (using a prior art technique, such as available on the software known as PHOTOSHOP®) to match the shape of an original warped image produced using the methods of the present invention. To do this using prior art methods, the outer sides would then need to increase vertically to 1354 pixels. However, simply warping the side screens using the PHOTOSHOP® software will produce a different effect (FIG. 14, top) for the end viewer than the 3D frontal mapping technique of the present disclosure, (FIG. 14, bottom).

Example 3: Use of Multiple Side Projectors and Auxiliary Side Screens

Figure 15:
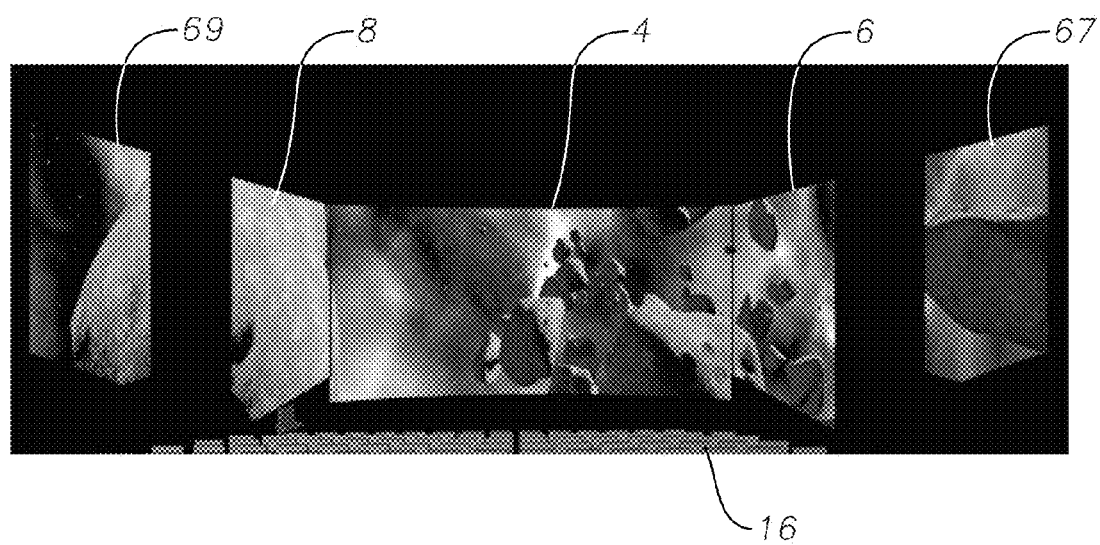

In certain systems and methods of the present disclosure, a theater or other venue owner may wish to display forced perspective content on three adjoining surfaces (center, left and right), but may wish to display on "auxiliary" surfaces or screens on the side walls of theater, theater lobby, or other structure, or other stand-alone screens, for example at a trade show. The auxiliary screens are separated from the "side extension" screens. In other words, an arrangement of 5 (or more) screens and digital cinema projectors as illustrated in FIG. 15.

Figure 16:
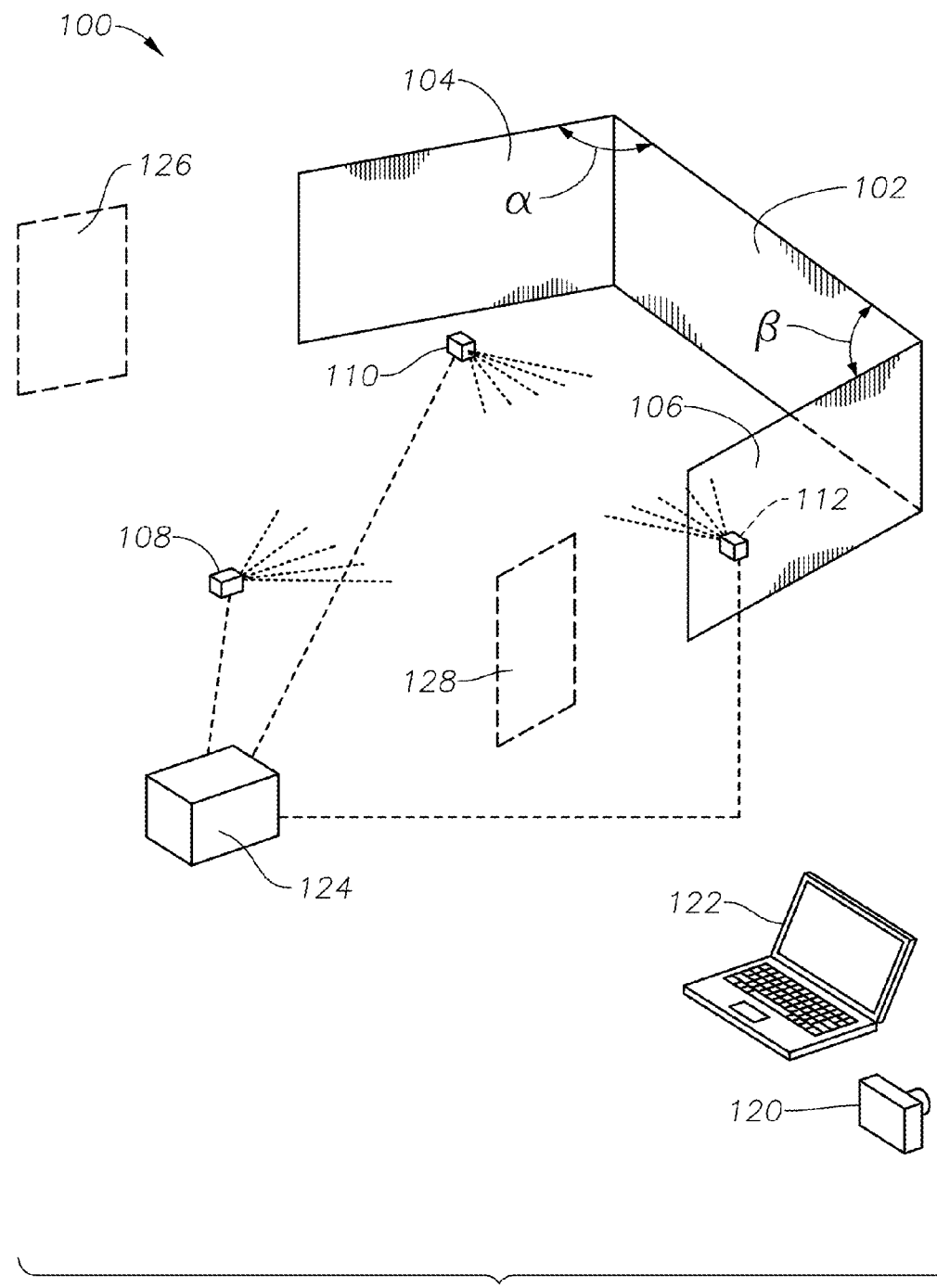
FIGS. 16-17 are schematic diagrams of two system embodiments of the present disclosure.
Figure 17:
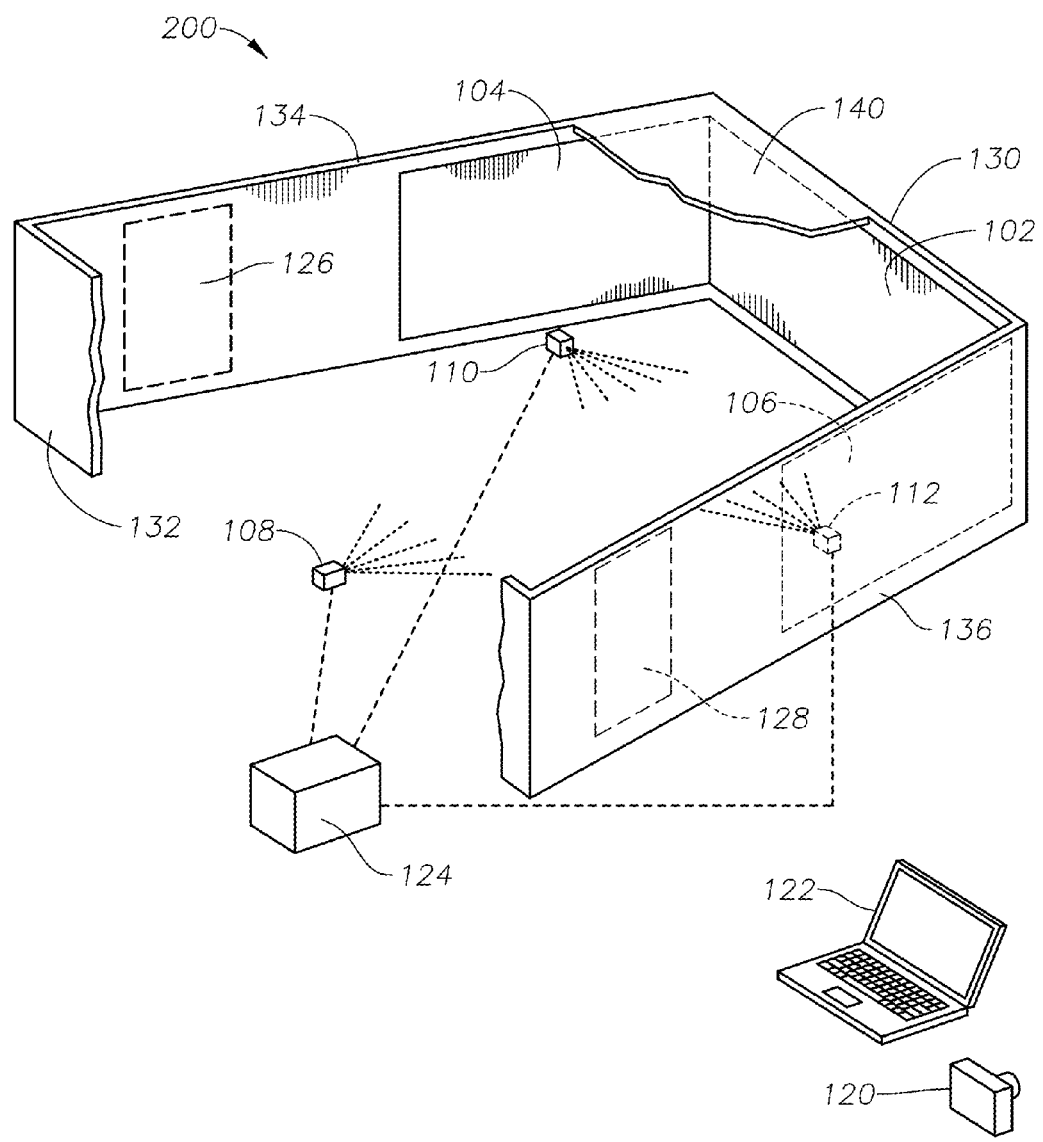

FIGS. 16 and 17 are schematic diagrams of two system embodiments 100 and 200 of the present disclosure. Embodiment 100, illustrated schematically in FIG. 16, includes a front or central screen 102, having a left side edge adjacent an abutting side edge of a left side screen 104, and a right side edge adjacent an abutting side edge of a right side screen 106. A primary digital cinema camera 108 projects images onto front screen 102, a right side digital cinema projector 106 projects baked, forced perspective images onto left side screen 104, and a left side digital cinema projector 110, projects baked, forced perspective images onto right side screen 106. System embodiment 100 further includes at least one digital camera 120, a computer 122 that performs the simulation of the real screens 102, 104, 106 and bakes the force perspective, and a server 124 for controlling the projection of the baked, forced perspective images. (It should be noted that the "brackets" in FIGS. 16 and 17 are for meeting patent drawing requirements only; origination of content using at least one digital camera 120 and/or a computer gaming engine (not shown), and computer 122 that performs the simulation, need not be, and typically are not physically located in the same building as screens and digital cinema projectors, although this is not ruled out, and may be preferred in certain embodiments.) Optional auxiliary screens 126, 128 may be provided, depending on the content to be shown, the desires of the operator or end users, and the like. More than one auxiliary screen per side may be provided. Screens 104, 106 need not be the same height or extend the same distance from screen 102, or even make the same angle with screen 102, but preferably screens 104, 106 are of equal dimensions and are angled at the same angle away from screen 102, that is, angles α and β are preferably substantially the same. Angles α and β may range from about 90 to about 175 degrees, more preferably from about 90 to about 125 degrees, or from about 100 to about 125 degrees. All ranges from about 90 to about 175 degrees are considered disclosed within this disclosure, and "about" means plus or minus 5 degrees from any lower or upper range terminus; for example from about 91 to about 121 degrees, or from 85 to 180 degrees. Alternatively, angles α and β may range from 90 to 175 degrees, more preferably from 90 to 125 degrees, or from 100 to 125 degrees. All ranges from 90 to 175 degrees are considered disclosed within this disclosure, for example, from 93 to 171 degrees.

FIG. 17 is a schematic diagram, with some portions broken away, of embodiment 200. Embodiment 200 illustrated schematically in FIG. 17 is similar to embodiment 100, except it includes structural elements as might be found in a theater retrofit with a system of this disclosure, for example a front wall 130, rear wall 132, left side wall 134, right side wall 136, floor 138, and roof 140, all connected to form a viewing room or cinema room. Seating is not illustrated.

Figure 18:
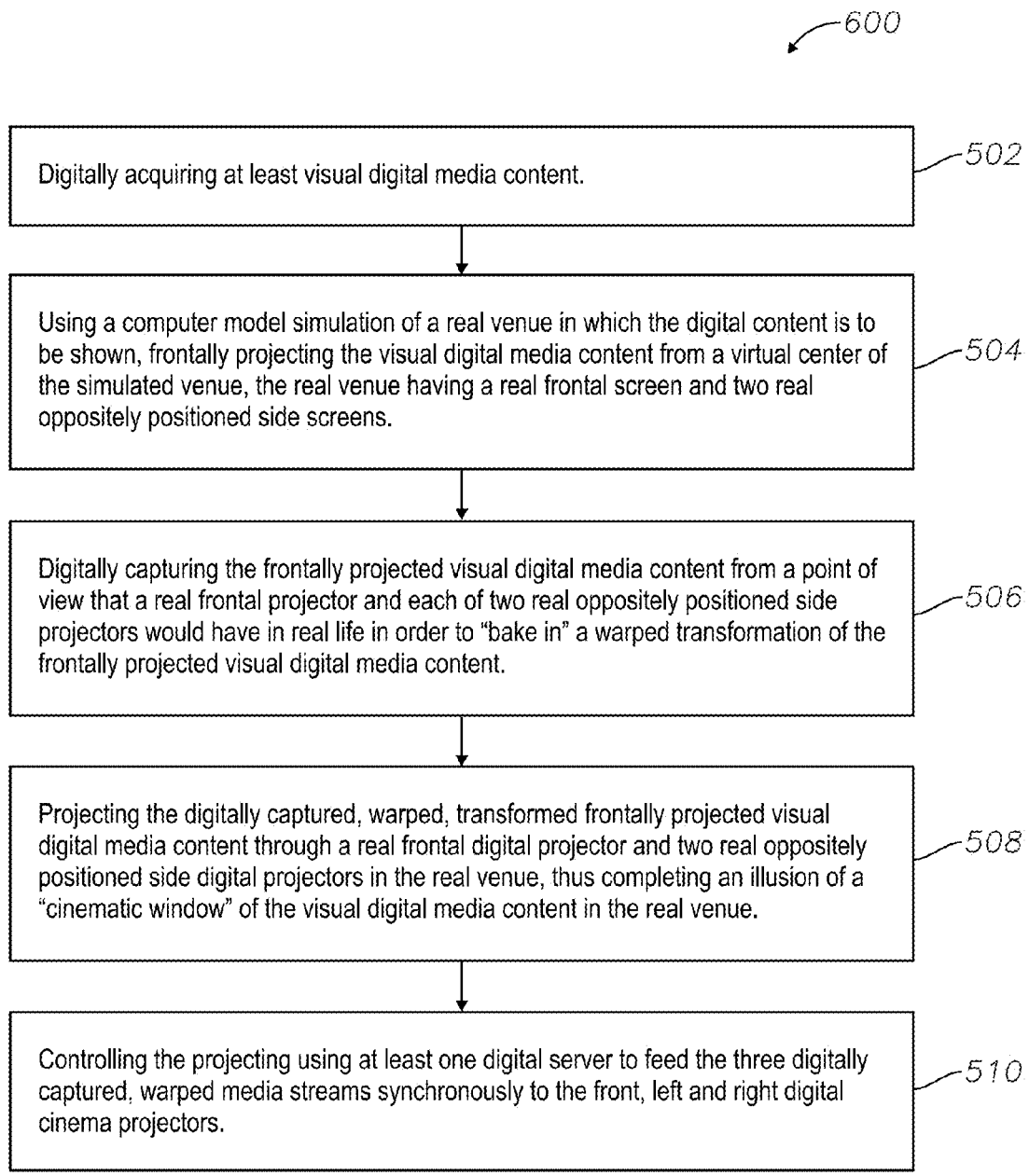
FIGS. 18 and 19A, 19B are logic diagrams of two method embodiments of the present disclosure.
Figure 19A:
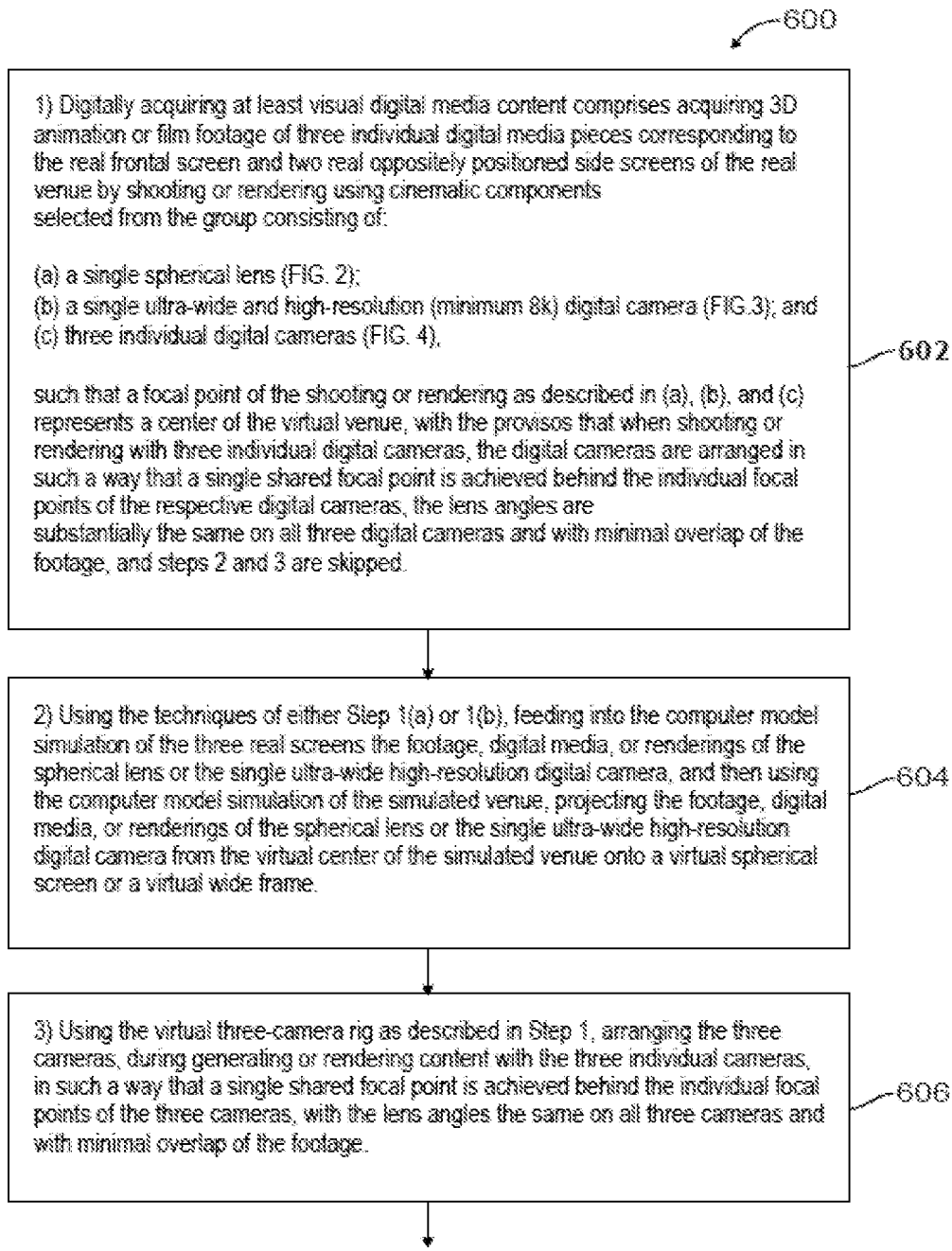
Figure 19B:
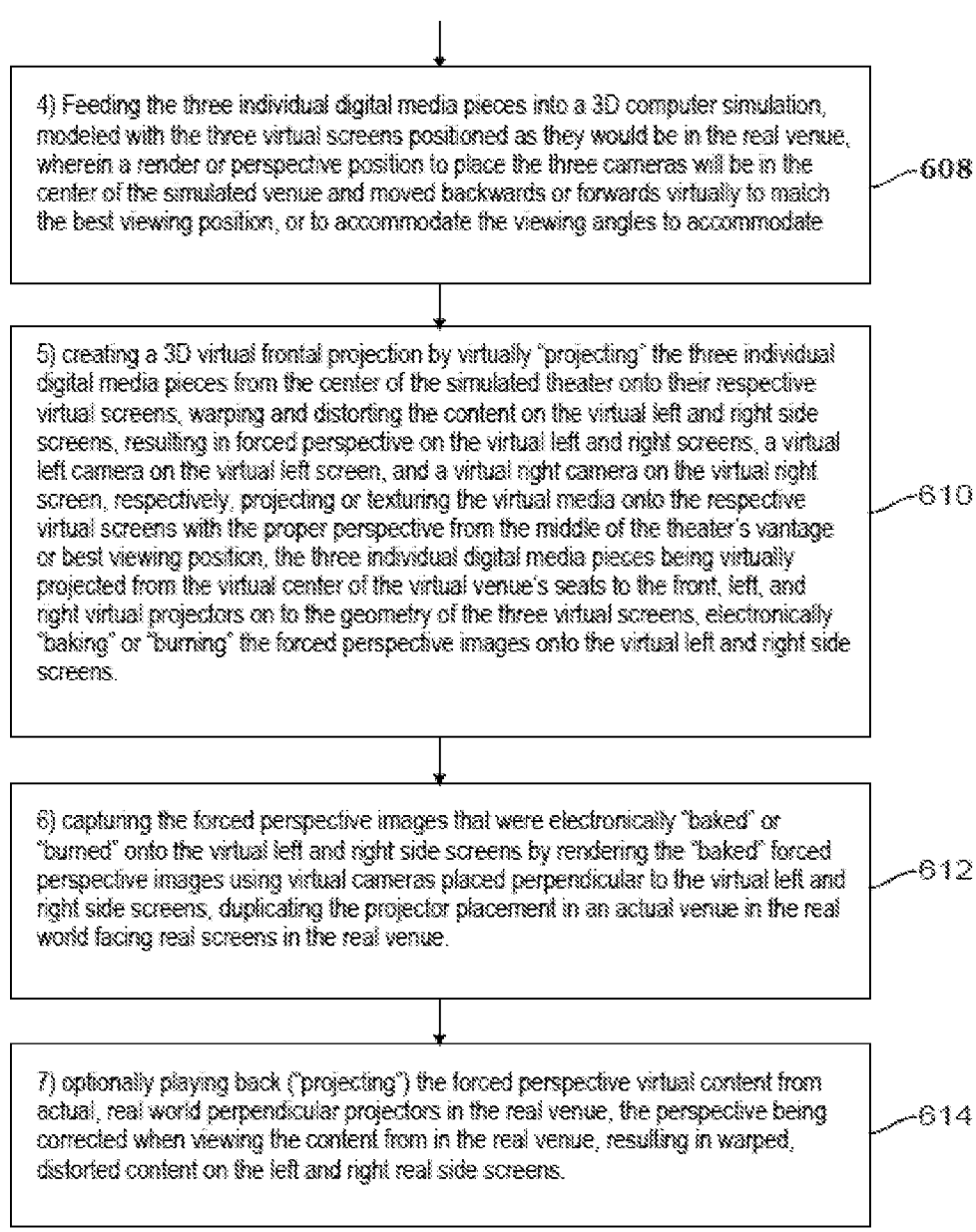

FIGS. 18 and 19A and 19B are logic diagrams of two non-limiting method embodiments 500 and 600 in accordance with the present disclosure. Method embodiment 500 comprises digitally acquiring at least visual digital media content, Box 502; using a computer model simulation of a real venue in which the digital content is to be shown, frontally projecting the visual digital media content from a virtual center of the simulated venue, the real venue having a real frontal screen and two real oppositely positioned side screens, Box 504; digitally capturing the frontally projected visual digital media content from a point of view that a real frontal projector and each of two real oppositely positioned side projectors would have in real life in order to "bake in" a warped transformation of the frontally projected visual digital media content, Box 506; projecting the digitally captured, warped, transformed frontally projected visual digital media content through a real frontal digital projector and two real oppositely positioned side digital projectors in the real venue, thus completing an illusion of a "cinematic window" of the visual digital media content in the real venue, Box 508; and controlling the projecting using at least one digital server to feed the three digitally captured, warped media streams synchronously to the front, left and right digital cinema projectors, Box 510.

Figure 2:
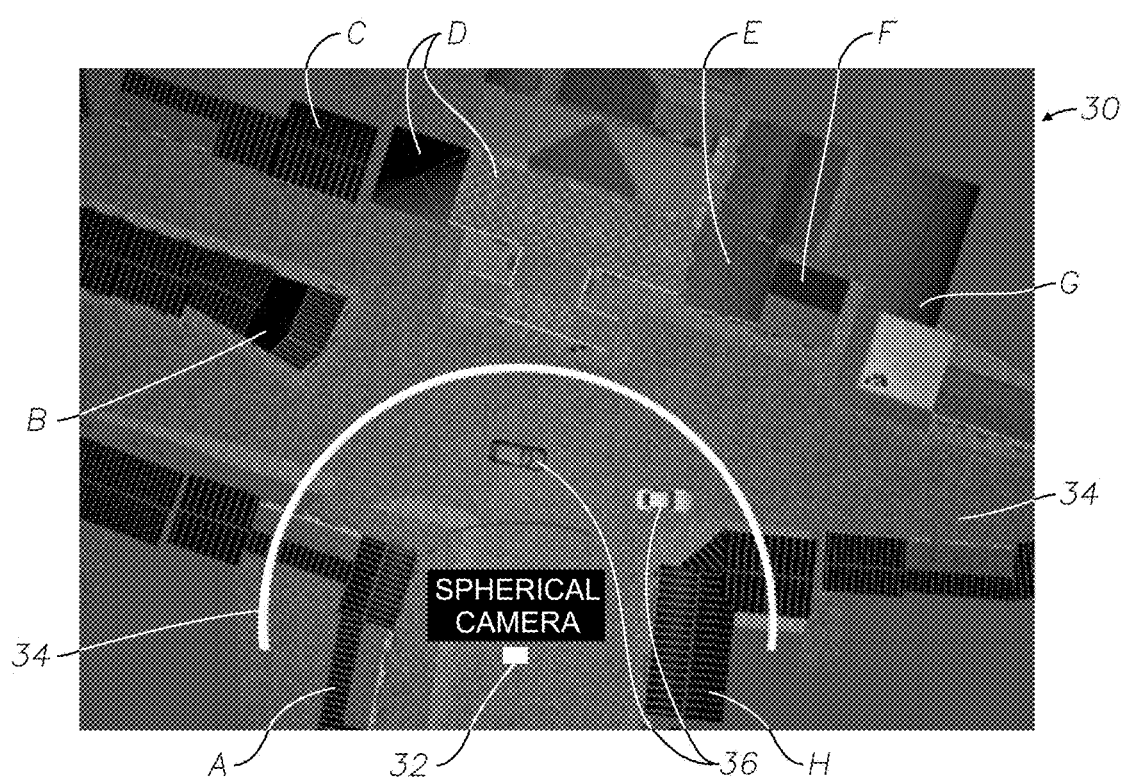
Figure 3:
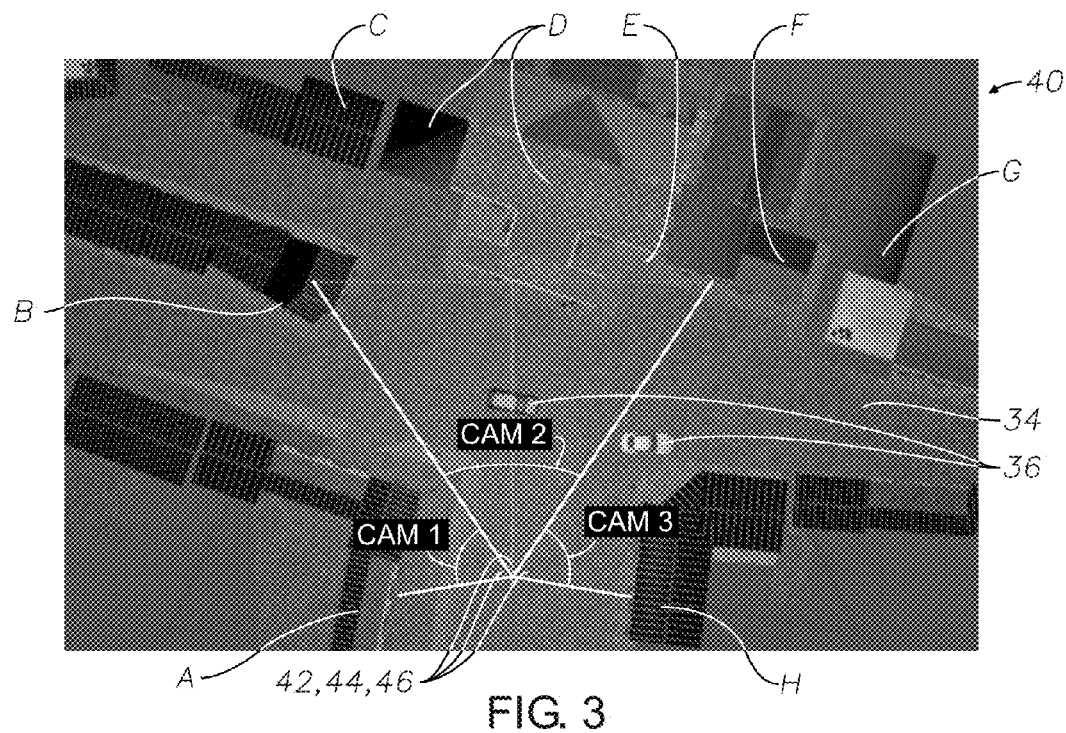

Method embodiment 600, illustrated in FIGS. 19A and 19B, comprises 1) digitally acquiring at least visual digital media content comprises acquiring 3D animation or film footage of three individual digital media pieces corresponding to the real frontal screen and two real oppositely positioned side screens of the real venue by shooting or rendering using cinematic components selected from the group consisting of:

(a) a single spherical lens (FIG. 2);
(b) a single ultra-wide and high-resolution (minimum 8 k) digital camera (FIG. 3); and
(c) three individual digital cameras (FIG. 4), such that a focal point of the shooting or rendering as described in (a), (b), and (c) represents a center of the virtual venue, with the provisos that when shooting or rendering with three individual digital cameras, the digital cameras are arranged in such a way that a single shared focal point is achieved behind the individual focal points of the respective digital cameras, the lens angles are substantially the same on all three digital cameras and with minimal overlap of the footage, and steps 2 and 3 are skipped, Box 602;

2) using the techniques of either Step 1(a) or 1(b), feeding into the computer model simulation of the three real screens the footage, digital media, or renderings of the spherical lens or the single ultra-wide high-resolution digital camera, and then using the computer model simulation of the simulated venue, projecting the footage, digital media, or renderings of the spherical lens or the single ultra-wide high-resolution digital camera from the virtual center of the simulated venue onto a virtual spherical screen or a virtual wide frame, Box 604;

3) using the virtual three-camera rig as described in Step 1, arranging the three cameras, during generating or rendering content with the three individual cameras, in such a way that a single shared focal point is achieved behind the individual focal points of the three cameras, with the lens angles the same on all three cameras and with minimal overlap of the footage, Box 606;

4) feeding the three individual digital media pieces into a 3D computer simulation, modeled with the three virtual screens positioned as they would be in the real venue, wherein a render or perspective position to place the three cameras will be in the center of the simulated venue and moved backwards or forwards virtually to match the best viewing position, or to accommodate the viewing angles to accommodate the footage or rendering angles, Box 608;

5) creating a 3D virtual frontal projection by virtually "projecting" the three individual digital media pieces from the center of the simulated theater onto their respective virtual screens, warping and distorting the content on the virtual left and right side screens, resulting in forced perspective on the virtual left and right screens, a virtual left camera on the virtual left screen, and a virtual right camera on the virtual right screen, respectively, projecting or texturing the virtual media onto the respective virtual screens with the proper perspective from the middle of the theater's vantage or best viewing position, the three individual digital media pieces being virtually projected from the virtual center of the virtual venue's seats to the front, left, and right virtual projectors on to the geometry of the three virtual screens, electronically "baking" or "burning" the forced perspective images onto the virtual left and right side screens, Box 610;

6) capturing the forced perspective images that were electronically "baked" or "burned" onto the virtual left and right side screens by rendering the "baked" forced perspective images using virtual cameras placed perpendicular to the virtual left and right side screens, duplicating the projector placement in an actual venue in the real world facing real screens in the real venue, Box 612; and 7) optionally playing back ("projecting") the forced perspective virtual content from actual, real world perpendicular projectors in the real venue, the perspective being corrected when viewing the content from in the real venue, resulting in warped, distorted content on the left and right real side screens, Box 614.

Other equipment that might be useful in systems, kits, methods, and computer-readable media of the present disclosure include the media block known under the trade designation QUBE XI™ Integrated Media Block (IMB), from Qube Cinema; CINESTORE SOLO G3™ digital cinema server, available from Barco, Inc. Rancho Cordova, Calif., and other servers currently able to run digital computer operating systems known under the trade designations MICROSOFT® WINDOWS®, APPLE® OS X™, and LINUX®.

Digital Cinema Projectors

At present, only four manufacturers make DCI-approved digital cinema projectors; these are Sony, Barco, Christie Digital Systems (Christie), and NEC. Except for Sony, who use their own SXRD® technology, all use the Digital Light Processing technology developed by Texas Instruments (TI). Although D-Cinema projectors are similar in principle to digital projectors used in industry, education and domestic "home cinemas" they differ in two important respects: firstly they must conform to the strict performance requirements of the DCI specification, secondly they must incorporate anti-piracy devices intended to protect the content copyright. For these reasons all projectors intended to be sold to theaters for screening current release movies must be approved by the DCI before being put on sale. They now pass through a process called CTP (Compliance Test Plan). Because feature films in digital form are encrypted and the decryption keys (KDM'S) are locked to the serial number of the server used (linking to both the projector serial number and server is planned in the future) a system will only allow playback of a protected feature with the required KDM. Without the KDM no playback is possible.

DLP® Cinema Projectors

Three manufacturers have licensed the DLP® cinema technology developed by TI: Christie, Barco, and NEC. DCI-compliant DLP projectors are available in 2K and, as of 2012, 4K, when TI's DLP chip went into full production. Manufacturers of DLP-based cinema projectors can now also offer 4K upgrades to some of the more recent 2K models. Early DLP Cinema Projectors used limited 1280× 1024 resolution or the equivalent of 1.3 MP (megapixels). 2K digital projectors may be used for pre-show advertising, or in lobbies of movie theaters, but are not preferred for feature presentations.

TI's technology is based on the use of Digital Micromirror Devices (DMDs). These devices are manufactured from silicon using similar technology to that of computer memory chips. The surface of these devices is covered by a very large number of microscopic mirrors, one for each pixel, so a 2K device has about 2.2 million mirrors and a 4K device about 8.8 million. Each mirror vibrates several thousand times a second between two positions: in one position, light from the projector's lamp is reflected toward the screen, in the other position light from the projector's lamp is reflected away from it. The proportion of the time the mirror is in each position varies according to the required brightness of each pixel. Three DMD devices are used, one for each of the primary colors. Light from the lamp, usually a Xenon similar to those used in film projectors with a power between 1 kW and 7 kW, is split by colored filters into red, green and blue beams which are directed at the appropriate DMD. The "forward" reflected beam from the three DMDs is then re-combined and focused by the lens onto the cinema screen.

Sony® SXRD® Projectors

Alone amongst the manufacturers of DCI-compliant cinema projectors Sony decided to develop its own technology rather than use TI's DLP® technology. As of 2014, SXRD® projectors have only ever been manufactured in 4K form and, until the launch of the 4K DLP® chip by TI, Sony SXRD® projectors were the only 4K DCI-compatible projectors on the market. Unlike DLP® projectors, however, SXRD® projectors do not present the left and right eye images of stereoscopic movies sequentially but use half the available area on the SXRD® chip for each eye image. Thus during stereoscopic presentations the SXRD® projector functions as a sub 2K projector, the same for HFR 3D Content.

The initial costs for converting theaters to digital are presently quite high: $100,000 per screen, on average. Theaters have been reluctant to switch without a cost-sharing arrangement with film distributors. A currently used solution is a temporary Virtual Print Fee system, where the distributor (who saves the money of producing and transporting a film print) pays a fee per copy to help finance the digital systems of the theaters.

A theater can purchase a film projector for less than $20,000 (though projectors intended for commercial cinemas cost two to three times that; to which must be to be added the cost of a long-play system, which also costs around $10,000, from which they could expect an average life of 30-40 years. By contrast, a digital cinema playback system—including server, media block, and a single projector—can cost two to three times as much, and may have a greater risk of component failure and obsolescence. The expense of digital image capture is not necessarily less than the capture of images onto film; indeed, it is sometimes greater.

Those having ordinary skill in this art will appreciate, after having read the present disclosure, that there are many possible variations of the methods, systems, and computer-readable media of the present disclosure, and will be able to devise alternatives and improvements to those described herein that are nevertheless considered to be within the claims of the present patent.

What is claimed is:

1. A method comprising:
    digitally acquiring digital media content selected from the group consisting of visual digital media content, audio digital media content, and digital data, and wherein the method comprises retrofitting the real venue, the real venue comprising an existing cinematic structure comprising a rear wall, a front wall, a floor, and left and right side walls;

creating a simulated venue using a computer model simulation of a real venue in which the digital content is to be played, and frontally projecting visual portions of the digital media content from a virtual center of the simulated venue onto a virtual frontal screen, a virtual left side screen, and a virtual right side screen, thereby electronically baking forced perspective images onto the virtual side screens;

digitally capturing, using virtual frontal, virtual left side and virtual right side cameras, the electronically baked forced perspective images of the frontally projected visual digital media content from a point of view that a real frontal digital cinema projector and each of two real oppositely positioned side digital cinema projectors would have in the real venue;

projecting the digitally captured, electronically baked forced perspective images of the frontally projected visual digital media content through the real frontal digital cinema projector and the two real oppositely positioned side digital cinema projectors in the real venue, thus completing an illusion of a cinematic window of the visual digital media content in the real venue; and synchronizing the projecting using at least one digital server.

2. The method of claim 1 wherein the digitally acquiring digital media content comprises shooting actual film footage using actual cinematic components or rendering virtual images using virtual cinematic components, the actual or virtual cinematic components selected from the group consisting of:
   (a) a single camera with a single spherical lens;
   (b) a single ultra-wide and high-resolution (minimum 8 k) digital camera; and
   (c) three individual digital cameras,
   such that a focal point of the selected cinematic components represents a virtual center of a simulated venue created using a computer model simulation of a real venue having a real frontal screen, a real left side screen, and a real right side screen.

3. A system comprising:
   one or more digital cameras or a digital computer using a gaming engine for digitally originating digital media content selected from the group consisting of visual digital media content, audio digital media content, and digital data;
   the digital computer or a separate computer using a computer model simulation of a real venue in which the digital content is to be showed, the real venue having a real frontal screen, a real left side screen, and a real right side screen, the computer model simulation configured to virtually frontally project, using virtual projectors, a visual portion of the digital media content from a virtual center of the simulated venue onto a virtual frontal screen, a virtual left side screen, and a virtual right side screen, and electronically bake forced perspective images onto the virtual side screens;
   the digital computer or a separate computer programmed to digitally capture, using virtual frontal, virtual left side and virtual right side cameras, the electronically baked forced perspective images of the frontally projected visual digital media content from points of view of a real digital projector projecting onto the frontal screen and two oppositely positioned real side projectors projecting onto the real left and right side screens would have in the real venue;
   a real frontal digital cinema projector, a real right side digital cinema projectors, and a real left side digital cinema projector in the real venue, the real digital cinema projectors projecting the digitally captured, electronically baked forced perspective images onto the real frontal screen, the real left side screen, and the real right side screen adjacent the real frontal screen in the real venue that completes an illusion of a cinematic window of the visual digital media content in the real venue; and
   at least one digital server configured to synchronize the frontal, left side and right side digital cinema projectors.

4. The system of claim 3 wherein the digitally acquiring digital media content comprises shooting actual film footage using actual cinematic components or rendering virtual images using virtual cinematic components, the actual or virtual cinematic components selected from the group consisting of:
   (a) a single camera with a single spherical lens;
   (b) a single ultra-wide and high-resolution (minimum 8 k) digital camera; and
   (c) three individual digital cameras,
   such that a focal point of the selected cinematic components represents a virtual center of the simulated venue created using a computer model simulation of the real venue having a real frontal screen, a real left side screen, and a real right side screen.

5. The system of claim 3 retrofitted into the real venue, wherein the real venue comprises an existing cinematic structure comprising a rear wall, a front wall, a floor, and left and right side walls.

6. The system of claim 5 wherein the real frontal digital cinema projector is positioned adjacent the rear wall.

7. The system of claim 3 wherein the real frontal screen is a primary reflecting screen having a left side edge and a right side edge.

8. The system of claim 7 wherein the real left screen is a left-side reflecting screen positioned with one edge adjacent the left side edge of the primary reflecting screen.

9. The system of claim 8 wherein the real right screen is a right-side reflecting screen positioned with one edge adjacent the right side edge of the primary reflecting screen.

10. The system of claim 5 wherein the floor slopes downward from the rear wall to the front wall at an angle ranging from 0 to about 30 degrees measured to horizontal.

11. The system of claim 3 wherein the primary, forward projecting digital cinema projector, the right side digital cinema projector, and the left side digital cinema projector each transmit an image at a resolution that is DCI compliant.

12. The system of claim 3 wherein each of the digital cinema projectors are selected from the group consisting of DLP and laser cinema projectors.

13. The system of claim 3 comprising an auxiliary right side digital projector projecting an auxiliary digital image onto a left side auxiliary screen separated from the left side extension screen, and an auxiliary left side digital projector projecting a right side auxiliary digital image onto a right side auxiliary screen separated from the right side extension screen.

14. The system of claim 3 wherein the server computer supports JPEG2000 and MPEG2 files, and dual-projector 3D playback.

15. The system of claim 3 wherein the real frontal screen, the real left side screen, and the real right side screen are rectangular.

16. A non-transitory computer-readable medium encoded with processing instructions for implementing a method comprising:

creating a simulated venue using a computer model simulation of a real venue in which at least visual digital media content is to be shown, and frontally projecting the visual digital media content from a virtual center of the simulated venue onto a virtual frontal screen, a virtual left side screen, and a virtual right side screen, thereby electronically baking forced perspective images onto the virtual side screens;

digitally capturing, using virtual frontal, virtual left side and virtual right side cameras, the electronically baked forced perspective images of the frontally projected visual digital media content from a point of view that a real frontal digital cinema projector and each of two real oppositely positioned side digital cinema projectors would have in the real venue;

projecting the digitally captured, electronically baked forced perspective images of the frontally projected visual digital media content through the real frontal digital cinema projector and the two real oppositely positioned side digital cinema projectors in the real venue, thus completing an illusion of a cinematic window of the visual digital media content in the real venue; and synchronizing the projecting using at least one digital server;

wherein the digitally captured, electronically baked forced perspective images and the digital media content projected by the two real oppositely positioned side digital cinema projectors comprises a collection of digital files in a file structure that is organized into one or more multi-gigabyte size Material eXchange Format (MXF) files, which are separately used to store audio and video streams, and auxiliary index files in XML format.

17. The non-transitory computer-readable medium of claim 16 wherein the MXF files are compressed, encoded, and encrypted in order to reduce the amount of required storage, wherein an MXF file containing the digitally captured, electronically baked forced perspective images and the digital media content projected by the two real oppositely positioned side digital cinema projectors contains compressed JPEG 2000 essence, an audio MXF file is a wrapped 24 bit linear PCM multichannel WAV file, and the encryption accords with a standard that is at least AES 128 bit in CBC mode.

* * * * *